# (12) United States Patent
Iida et al.

(10) Patent No.: US 7,414,358 B2
(45) Date of Patent: Aug. 19, 2008

(54) FLUORESCENT LAMP AND MANUFACTURING METHOD FOR ARC TUBE

(75) Inventors: Shiro Iida, Kyoto (JP); Kenji Nakano, Kyoto (JP); Noriyuki Uchida, Hirakata (JP); Tatsuhiro Yabuki, Takatsuki (JP); Junichi Takahashi, Takatsuki (JP); Takashi Ueda, Takatsuki (JP); Hiroki Kitagawa, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 499 days.

(21) Appl. No.: 10/494,407

(22) PCT Filed: Nov. 12, 2002

(86) PCT No.: PCT/JP02/11757

§ 371 (c)(1),
(2), (4) Date: Nov. 15, 2004

(87) PCT Pub. No.: WO03/043055

PCT Pub. Date: May 22, 2003

(65) Prior Publication Data

US 2005/0068775 A1    Mar. 31, 2005

(30) Foreign Application Priority Data

Nov. 14, 2001  (JP) ............................. 2001-349423
Jan. 7, 2002   (JP) ............................. 2002-000857
Mar. 29, 2002  (JP) ............................. 2002-096615

(51) Int. Cl.
    *H01J 61/52*    (2006.01)
(52) U.S. Cl. ...................... 313/493; 313/639
(58) Field of Classification Search ................ 313/634, 313/493, 637–642, 110, 116; 362/266
    See application file for complete search history.

(56) References Cited

U.S. PATENT DOCUMENTS

| 4,772,819 A | * | 9/1988 | Ridders ...................... 313/493 |
| 5,174,646 A |   | 12/1992 | Siminovitch et al. ........ 362/218 |
| 5,537,301 A |   | 7/1996 | Martich ....................... 362/218 |
| 5,552,666 A |   | 9/1996 | Shea et al. |
| 5,705,883 A | * | 1/1998 | Soules et al. ........... 313/318.09 |

(Continued)

FOREIGN PATENT DOCUMENTS

CN    1170107 A    4/1998

(Continued)

*Primary Examiner*—Nimeshkumar D. Patel
*Assistant Examiner*—Christopher M Raabe

(57) ABSTRACT

Disclosed is a compact self-ballasted fluorescent lamp with higher luminous efficiency than conventional lamps and improved luminous flux rising characteristics at lamp startup equivalent to those of general fluorescent lamps. The compact self-ballasted fluorescent lamp (1) includes an arc tube (2) formed by a bent glass tube (9) covered with a globe (6). The glass tube (9) has a turning part substantially in the middle between its both ends, a first spiral part starting from one end and wound around an axis toward the turning part, and a second spiral part starting from the turning part and wound around the axis toward the other end. The arc tube (2) has mercury enclosed therein in a single form. The glass tube (9) has a substantially circular-shaped cross section and an inner diameter of 7.4 mm. The turning part is connected to the globe (9) via a heat-conductive member (15).

29 Claims, 19 Drawing Sheets

U.S. PATENT DOCUMENTS

| | | | | |
|---|---|---|---|---|
| 5,713,659 | A | * | 2/1998 | Hillstrom et al. ............. 362/240 |
| 5,751,104 | A | * | 5/1998 | Soules et al. ................. 313/493 |
| 6,064,155 | A | * | 5/2000 | Maya et al. ................... 315/56 |
| 6,124,679 | A | | 9/2000 | Vrionis ....................... 315/248 |
| 6,437,502 | B1 | | 8/2002 | Nishio et al. |
| 6,633,128 | B2 | | 10/2003 | Ilyes et al. |
| 6,759,797 | B2 | * | 7/2004 | Tokes et al. ............ 313/318.01 |

FOREIGN PATENT DOCUMENTS

| | | |
|---|---|---|
| DE | 92 11 367.2 | 10/1992 |
| DE | 198 55 240 A1 | 5/2000 |
| EP | 0 735 567 | 1/1996 |
| EP | 0 735 569 | 1/1996 |
| EP | 0 744 762 | 11/1996 |
| EP | 0 807 958 | 11/1997 |
| JP | 58178951 | 10/1983 |
| JP | 58181263 | 10/1983 |
| JP | 58197650 | 11/1983 |
| JP | 58198849 | 11/1983 |
| JP | 59012535 | 1/1984 |
| JP | 59014236 | 1/1984 |
| JP | 03-022016 | 1/1991 |
| JP | 03-022017 | 1/1991 |
| JP | 07-192689 | 7/1995 |
| JP | 8-222183 | 8/1996 |
| JP | 8-339780 | 12/1996 |
| JP | 9-17378 | 1/1997 |
| JP | 09-045281 | 2/1997 |
| JP | 2000-021351 | 1/2000 |
| JP | 2000-067812 | 3/2000 |
| JP | 2000-251836 | 9/2000 |
| TW | 445492 B | 7/2001 |

* cited by examiner

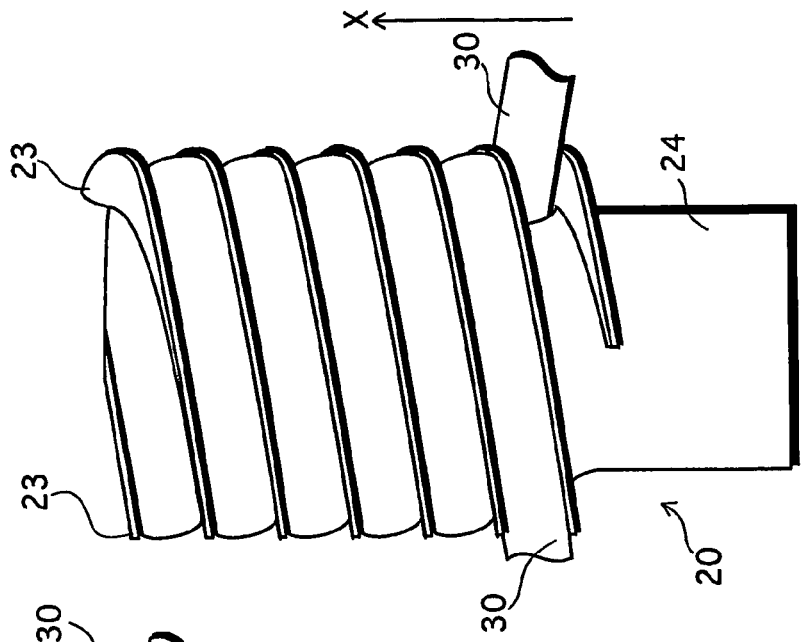
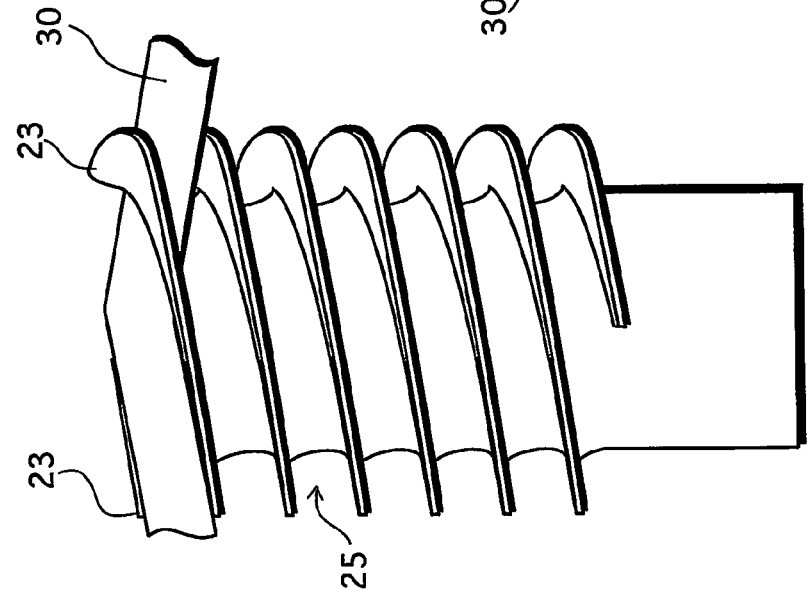
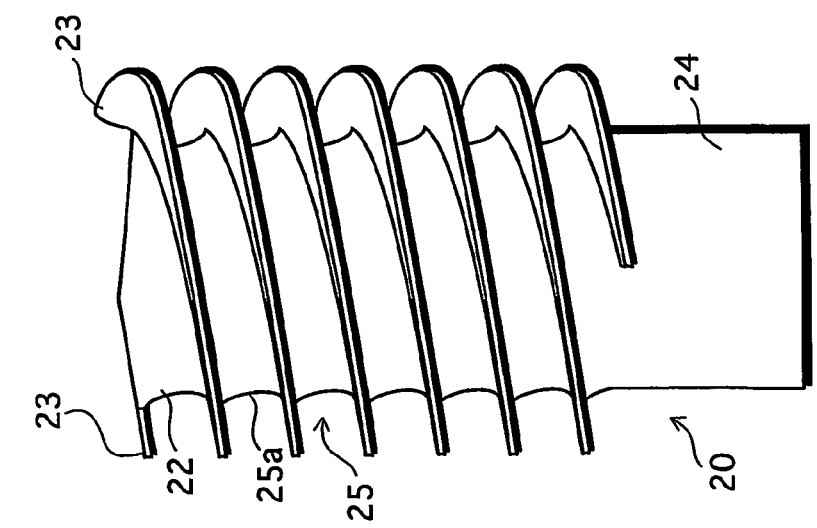

though, it may be easier to have a lamp in which mercury is enclosed in the single form.

FLUORESCENT LAMP AND MANUFACTURING METHOD FOR ARC TUBE

TECHNICAL FIELD

The present invention relates to a compact self-ballasted fluorescent lamp that includes a bent arc tube, and to a manufacturing method for the arc tube.

BACKGROUND ART

In the present energy-saving era, compact self-ballasted fluorescent lamps that exhibit high luminous efficiency and long life are calling attentions as alternative light sources to incandescent lamps. Compact self-ballasted fluorescent lamps (hereafter simply referred to as "lamps") have bent arc tubes. Roughly two design types of such lamps are available, namely, lamps having globes for covering arc tubes, and lamps not having globes for covering arc tubes. Hereafter, a lamp having a globe is referred to as a "globe-type lamp" and a lamp not having a globe is referred to as a "non globe-type lamp".

The difference between a globe-type lamp and a non globe-type lamp lies not only in the presence of a globe, but also in the form of mercury enclosed within an arc tube. For a globe-type lamp, mercury is enclosed within its arc tube in the form of an alloy containing bismuth (Bi), indium (In), tin (Sn), and the like, i.e., in the form of an amalgam. For a non globe-type lamp, mercury is enclosed within its arc tube not in the form of an amalgam but in a single form.

For a globe-type lamp, too, mercury used to be enclosed within its arc tube in the single form. However, a globe-type lamp in which mercury is enclosed in the single form has the following problem. When such a globe-type lamp is lit, heat is trapped in its globe covering the arc tube, causing the temperature of the arc tube to increase excessively. Along with this, a mercury vapor pressure within the arc tube increases, thereby greatly degrading the luminous efficiency of the lamp. For a non globe-type lamp, mercury is still enclosed within its arc tube in the single form because the temperature of the arc tube does not increase much during lighting and so only subtle degradation of the luminous efficiency occurs.

In view of the above problem, a number of techniques for suppressing an increase of a mercury vapor pressure within an arc tube have been proposed as disclosed in Japanese published examined application Nos. H03-22016, H03-22017, H03-24018, and H03-24019. However, these techniques can be effective only for lamps of energy-saving type, such as a 9 W lamp that is an alternative to a 40 W incandescent lamp. For a 12 W lamp and a 22 W lamp that are alternatives to a 60 W incandescent lamp and a 100 W incandescent lamp, the temperature of an arc tube increases excessively during lighting, and accordingly, these techniques fail to effectively suppress the increase of the mercury vapor pressure.

With such a background, a technique that can be applied to a 12 W lamp and a 22 W lamp that are alternatives to a 60 W incandescent lamp and a 100 W incandescent lamp has been developed. The technique is to enclose mercury within an arc tube in the form of an amalgam as employed in a conventional lamp, instead of enclosing mercury within an arc tube in the single form. This technique has been found to prevent degradation of the luminous efficiency when using an amalgam selected from BiIn, BiPbSn, InPb, BiIn, and InPbSn. It should be noted here that this technique of using an amalgam is now predominantly employed for globe-type lamps.

As a result, for a 12 W lamp using a triple U-shape arc tube or a quad U-shape arc tube that is an alternative to a 60 W incandescent lamp, the luminous efficiency of 68 lm/W level has been achieved.

These various techniques described above have greatly improved the luminous efficiency of lamps. However, due to an amalgam enclosed within an arc tube for the purpose of suppressing degradation of the luminous efficiency, rising of the luminous flux at the lamp startup is delayed. To be more specific, mercury is absorbed by an amalgam when the lamp is turned off. This reduces the luminous flux at the lamp startup because a mercury vapor pressure at the lamp startup is relatively low as compared with a lamp in which mercury is enclosed within an arc tube in the single form.

DISCLOSURE OF THE INVENTION

The present invention aims to provide a compact self-ballasted fluorescent lamp with higher luminous efficiency than conventional compact lamps, and with improved luminous flux rising characteristics at lamp startup equivalent to those of general fluorescent lamps, and a manufacturing method for an arc tube that can further improve luminous efficiency.

The above aim of the present invention can be fulfilled by a compact self-ballasted fluorescent lamp including: an arc tube that is formed by a bent glass tube and in which mercury is enclosed; a globe that covers the arc tube; and a heat-conductive member that is provided between the arc tube and the globe for conducting heat from the arc tube to the globe, wherein the mercury enclosed in the arc tube is in at least one of (a) a substantially single form, and (b) an amalgam form whose mercury vapor pressure characteristics at lighting are substantially equivalent to mercury vapor pressure characteristics of mercury in a single form at lighting, and the glass tube has a substantially circular-shaped cross section, and has an inner diameter in a range of 5 to 9 mm inclusive. In particular, the amalgam form of mercury is at least one amalgam selected from the group consisting of ZnHg, FeHg, BiHg, BiSnHg, and SnHg.

According to this construction, mercury is enclosed within the arc tube in the single form, and therefore, the luminous flux rising characteristics equivalent to those of a fluorescent lamp for general lighting can be obtained. Further, the inner tube diameter of the glass tube is set in the range of 5 to 9 mm inclusive, and therefore, an optical path on which ultraviolet light emitted from mercury atoms travels to the tube wall of the arc tube can be shortened. As a result, the temperature at which the arc tube achieves the maximum luminous flux can be increased. Therefore, a difference between the temperature at which the arc tube achieves the maximum luminous flux and the temperature of the arc tube during lighting of the lamp can be narrowed. Accordingly, the luminous efficiency higher than that for a conventional lamp can be obtained.

Also, the arc tube includes electrodes that are provided at both ends of the glass tube, and when an inner diameter "$\phi i$ (mm)" of the glass tube and a distance "Le (mm)" between the electrodes are expressed as rectangular coordinates ($\phi i$, Le), values for the rectangular coordinates ($\phi i$, Le) are within a range surrounded by points (5.0, 370), (7.4, 275), (9.0, 290), (9.0, 360), and (5.0, 690).

By applying this construction to a conventional lamp that is an alternative to a 60 W incandescent lamp, the luminous efficiency can be improved to a level equivalent to or higher than the conventional lamp. Also, the lamp life of 6000 hours can be ensured. Further, the lamp can be made as compact as or more compact than the conventional lamp as an alternative to a 60 W incandescent lamp.

Further, the arc tube includes electrodes that are provided at both ends of the glass tube, and when an inner diameter "φi (mm)" of the glass tube and a distance "Le (mm)" between the electrodes are expressed as rectangular coordinates (φi, Le), values for the rectangular coordinates (φi, Le) are within a range surrounded by points (5.0, 700), (7.4, 530), (9.0, 560), (9.0, 620), and (5.0, 930).

By applying this construction to a conventional lamp that is an alternative to a 100 W incandescent lamp, the luminous efficiency can be improved to a level equivalent to or higher than the conventional lamp. Also, the lamp life of 6000 hours can be ensured. Further, the lamp can be made as compact as or more compact than the conventional lamp as an alternative to a 100 W incandescent lamp.

Moreover, the arc tube includes electrodes that are provided at both ends of the glass tube, and when an inner diameter "φi (mm)" of the glass tube and a distance "Le (mm)" between the electrodes are expressed as rectangular coordinates (φi, Le), values for the rectangular coordinates (φi, Le) are within a range surrounded by points (5.0, 800), (7.4, 570), (9.0, 600), (9.0, 670), and (5.0, 1000).

By applying this construction to a high-luminous-flux type 23 W lamp that is an alternative to a 100 W incandescent lamp, the luminous efficiency can be improved to a level equivalent to or higher than the conventional high-luminous-flux type 23 W lamp. Also, the lamp life of 6000 hours can be ensured. Further, the lamp can be made as compact as or more compact than the conventional high-luminous-flux type 23 W lamp.

Moreover, the arc tube includes electrodes that are provided at both ends of the glass tube, and when an inner diameter "φi (mm)" of the glass tube and a distance "Le (mm)" between the electrodes are expressed as rectangular coordinates (φi, Le), values for the rectangular coordinates (φi, Le) are within a range surrounded by points (5.0, 270), (7.4, 200), (9.0, 230), (9.0, 320), and (5.0, 590).

By applying this construction to a 7 W lamp that is an alternative to a 40 W incandescent lamp, the luminous efficiency can be improved to a level equivalent to or higher than a conventional lamp. Also, the lamp life of 6000 hours can be ensured. Further, the lamp can be made as compact as or more compact than the conventional 7 W lamp.

Also, the glass tube has a double-spiral structure that is made up of a turning part, a first spiral part, and a second spiral part, the turning part being positioned substantially in a middle between both ends of the glass tube, the first spiral part starting from one end of the glass tube and being wound around an axis toward the turning part, the second spiral part starting from the turning part and being wound around the axis toward the other end of the glass tube, and the glass tube is connected to the globe in a vicinity of the turning part thereof, via the heat-conductive member.

According to this construction, the coolest point of the arc tube is formed in a vicinity of the turning part during lighting of the lamp. Heat in this coolest point part can be conducted to the globe via the heat-conductive member. Therefore, the temperature of the coolest point of the arc tube can be effectively lowered.

Further, the turning part of the glass tube has a projection toward the globe.

According to this construction, an area where the arc tube and the heat-conductive member are connected with each other can be increased.

The aim of the present invention can also be fulfilled by a compact self-ballasted fluorescent lamp including an arc tube that is made by a spirally bent glass tube, wherein a cross section of the glass tube at an inner circumference thereof is in a non-circular shape. In particular, the compact self-ballasted fluorescent lamp is the glass tube is spirally wound around an axis, and a first diameter of the cross section at the inner circumference is smaller than a second diameter of the cross section at the inner circumference, the first diameter being in a direction substantially perpendicular to the axis, the second diameter being in a direction substantially parallel to the axis.

More specifically, the cross section of the glass tube is in a substantially oval-shape, or the cross section of the glass tube is in a V-shape.

According to this construction, the first diameter is smaller than the second diameter. In this case, an optical path on which ultraviolet light emitted form mercury atoms travels to the tube wall of the arc tube can be shortened, and also, the temperature at which the arc tube achieves the maximum luminous flux can be increased, as compared with the case where the inner circumference of the glass tube is in such a circular shape having the diameter being equal to the second diameter. Therefore, a difference between the temperature at which the arc tube achieves the maximum luminous flux and the temperature of the arc tube during lighting of the lamp can be narrowed, and so the luminous efficiency can be improved. Further, because the inner circumference of the first diameter is in the direction substantially perpendicular to the axis of the arc tube, the inner circumference part (positioned at the axis side) of the oval-shaped cross section of the glass tube is more distant from the axis than the inner circumference part (positioned at the axis side) of a circular-shaped cross section of the glass tube. Therefore, the electrode distance can be lengthened and the luminous efficiency can be improved, as compared with the case where the glass tube has a circular-shaped cross section.

Also, when the first diameter is "D1 (mm)" and the second diameter is "D2 (mm)", a value for "D2" is in a range of 5 to 9 mm inclusive, and a value for "D1" is not less than 3 mm and is less than the value for "D2".

According to this construction, an optical path on which ultraviolet light emitted from mercury atoms travels to the tube wall of the arc tube can be shortened, and the temperature at which the arc tube achieves the maximum luminous flux can be increased. Therefore, even if the temperature of the arc tube increases during lighting of the lamp, a decrease in the luminous efficiency can be suppressed. Also, the electrodes can be easily placed in the arc tube by utilizing the second diameter.

Further, the arc tube includes electrodes that are provided at both ends of the glass tube, and when the first diameter "D1 (mm)" and a distance "Le (mm)" between the electrodes are expressed as rectangular coordinates (D1, Le), values for the rectangular coordinates (D1, Le) are within a range surrounded by points (3.0, 445), (7.4, 275), (9.0, 290), (9.0, 360), and (3.0, 855).

By applying this construction to a conventional lamp that is an alternative to a 60 W incandescent lamp, the luminous efficiency can be improved to a level equivalent to or higher than a conventional lamp. Also, the lamp life of 6000 hours can be ensured. Further, the lamp can be made as compact as or more compact than the conventional lamp.

Further, the arc tube includes electrodes that are provided at both ends of the glass tube, and when the first diameter "D1 (mm)" and a distance "Le (mm)" between the electrodes are expressed as rectangular coordinates (D1, Le), values for the rectangular coordinates (D1, Le) are within a range surrounded by points (3.0, 840), (7.4, 530), (9.0, 560), (9.0, 620), and (3.0, 1085).

By applying this construction to a conventional lamp that is an alternative to a 100 W incandescent lamp, the luminous efficiency can be improved to a level equivalent to or higher than the conventional lamp. Also, the lamp life of 6000 hours can be ensured. Further, the lamp can be made as compact as or more compact than a conventional 22 W lamp as an alternative to the 100 W incandescent lamp.

Moreover, the arc tube includes electrodes that are provided at both ends of the glass tube, and when the first diameter "D1 (mm)" and a distance "Le (mm)" between the electrodes are expressed as rectangular coordinates (D1, Le), values for the rectangular coordinates (D1, Le) are within a range surrounded by points (3.0, 975), (7.4, 570), (9.0, 600), (9.0, 670), and (3.0, 1165).

By applying this construction to a high-luminous-flux type 23 W lamp that is an alternative to a 100 W incandescent lamp, the luminous efficiency can be improved to a level equivalent to or higher than the conventional high-luminous-flux type 23 W lamp. Also, the lamp life of 6000 hours can be ensured. Further, the lamp can be made as compact as or more compact than the conventional 22 W lamp.

Alternatively, the arc tube includes electrodes that are provided at both ends of the glass tube, and when the first diameter "D1 (mm)" and a distance "Le (mm)" between the electrodes are expressed as rectangular coordinates (D1, Le), values for the rectangular coordinates (D1, Le) are within a range surrounded by points (3.0, 330), (7.4, 200), (9.0, 230), (9.0, 320), and (3.0, 725).

By applying this construction to a 7 W lamp that is an alternative to a 40 W incandescent lamp, the luminous efficiency can be improved to a level equivalent to or higher than the conventional 7 W lamp. Also, the lamp life of 6000 hours can be ensured. Further, the lamp can be made as compact as or more compact than the conventional lamp.

On the other hand, the glass tube has a double-spiral structure that is made up of a turning part, a first spiral part, and a second spiral part, the turning part being positioned substantially in a middle between both ends of the glass tube, the first spiral part starting from one end of the glass tube and being wound around an axis toward the turning part, the second spiral part starting from the turning part and being wound around the axis toward the other end of the glass tube.

According to this construction, a limited space within the globe can be effectively used, and the electrode distance can be set long, compared with the case of, for example, a triple U-shape arc tube.

Also, mercury is enclosed within the arc tube in a substantially single form without being in an amalgam form.

According to this construction, the luminous flux rising characteristics at the lamp startup can be improved further as compared with the case where mercury is enclosed within the arc tube in the form of an amalgam.

Further, the compact self-ballasted fluorescent lamp further includes a globe that covers the arc tube, wherein the glass tube is connected to the globe in a vicinity of the turning part thereof, via the heat-conductive member.

According to this construction, heat in the turning part of the arc tube can be conducted to the globe via the heat-conductive member. Therefore, the temperature of the arc tube can be effectively lowered.

Further, the glass tube has a circular-shaped cross section at parts thereof where electrodes are sealed.

According to this construction, the electrodes can be easily placed and sealed in the glass tube, regardless of a shape of the middle part of the glass tube.

Also, a distance between the turning part and the globe that are connected with each other via the heat-conductive member is not more than 6.0 mm.

According to this construction, heat in the turning part of the arc tube can be effectively conducted to the globe.

Further, one of metal, rubber, and resin is used as the heat-conductive member. In particular, a transparent silicone resin is used as the heat-conductive member. Therefore, the temperature of the arc tube can be decreased without spoiling the appearance of the arc tube.

Further, a swelling part that increases an area where the arc tube and the heat-conductive member are connected with each other is provided at a part of the arc tube that is connected to the heat-conductive member.

According to this construction, the temperature of the arc tube can be lowered by 1 to 2° C., and therefore, the luminous efficiency during lighting of the lamp can be improved further.

Also, a distance between the turning part of the glass tube and each of the first spiral part and the second spiral part is smaller than an outer diameter of the turning part of the glass tube.

According to this construction, light distribution in the direction opposite to the electrode that is positioned in the axis direction of the arc tube can be made uniform.

On the other hand, the manufacturing method may be a manufacturing method for a spiral arc tube by winding a softened glass tube around a mandrel along a spiral groove formed at an outer surface of the mandrel, wherein a cross section of the groove is in a non arc-shape, or may be the manufacturing method for the arc tube, wherein the cross section of the groove is in a shape substantially matching a part of an oval-shape with a major diameter being in a direction substantially parallel to an axis around which the glass tube is wound, or may be the manufacturing method for the arc tube, wherein the cross section of the groove is in a V-shape. By using this manufacturing method, the cross section of the glass tube at the inner circumference can be easily made into a non-circular shape, an oval-shape, or a V-shape.

Further, the groove has a double-spiral structure having spiral parts extending from a top of the mandrel toward a bottom of the mandrel, and the double-spiral arc tube is manufactured by winding a glass tube around the mandrel in a state where a substantially middle part of the glass tube is aligned with the top of the mandrel, and therefore, an arc tube having a double-spiral structure can be easily manufactured.

Also, when the glass tube is wound around the mandrel, a compressed fluid is injected into the glass tube, and therefore, the softened glass tube can be prevented from being crushed.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIGS. 3A to 3C are front views showing a process of winding a glass tube around a mandrel to shape the arc tube according to the first embodiment;

BEST MODE FOR CARRYING OUT THE INVENTION

The following describes a compact self-ballasted fluorescent lamp of the present invention, with reference to the drawings.

First Embodiment

1. Construction of Compact Self-Ballasted Fluorescent Lamp

1) Overall Construction

Figure 1:
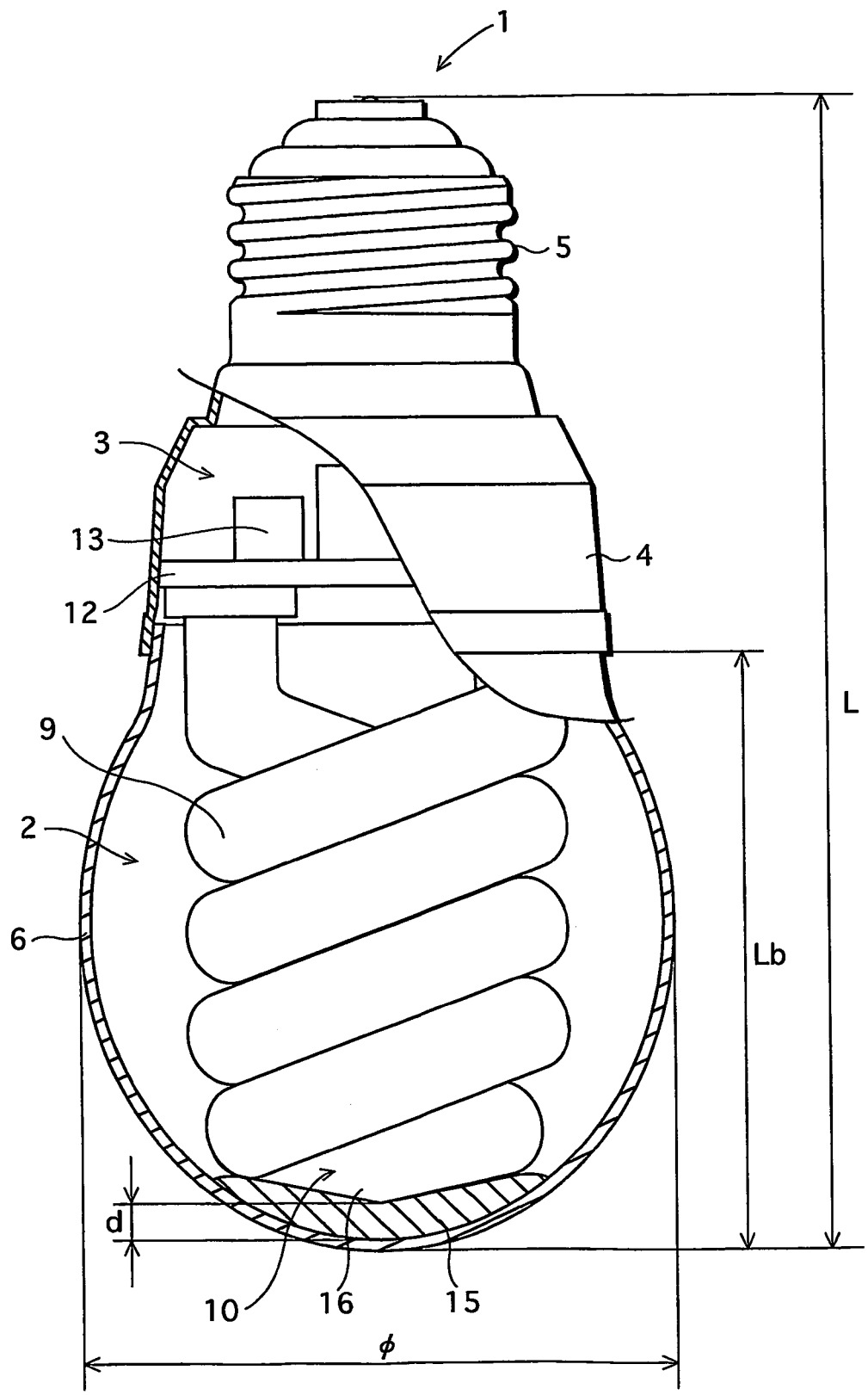
FIG. 1 is a front view showing the overall construction of a compact self-ballasted fluorescent lamp according to a first embodiment of the present invention, partially cut away to show its inside.

FIG. 1 is a front view showing the overall construction of the compact self-ballasted fluorescent lamp of the present invention, partially cut away to show its inside. This compact self-ballasted fluorescent lamp 1 (hereafter simply, "lamp 1") is a 11 W lamp that is an alternative to a 60 W incandescent lamp. As shown in the figure, the lamp 1 includes an arc tube 2 that is spirally bent, a ballast circuit 3 for lighting the arc tube 2, a case 4 that contains the ballast circuit 3 and has a base 5, and a globe 6 that covers the arc tube 2.

Figure 2A:
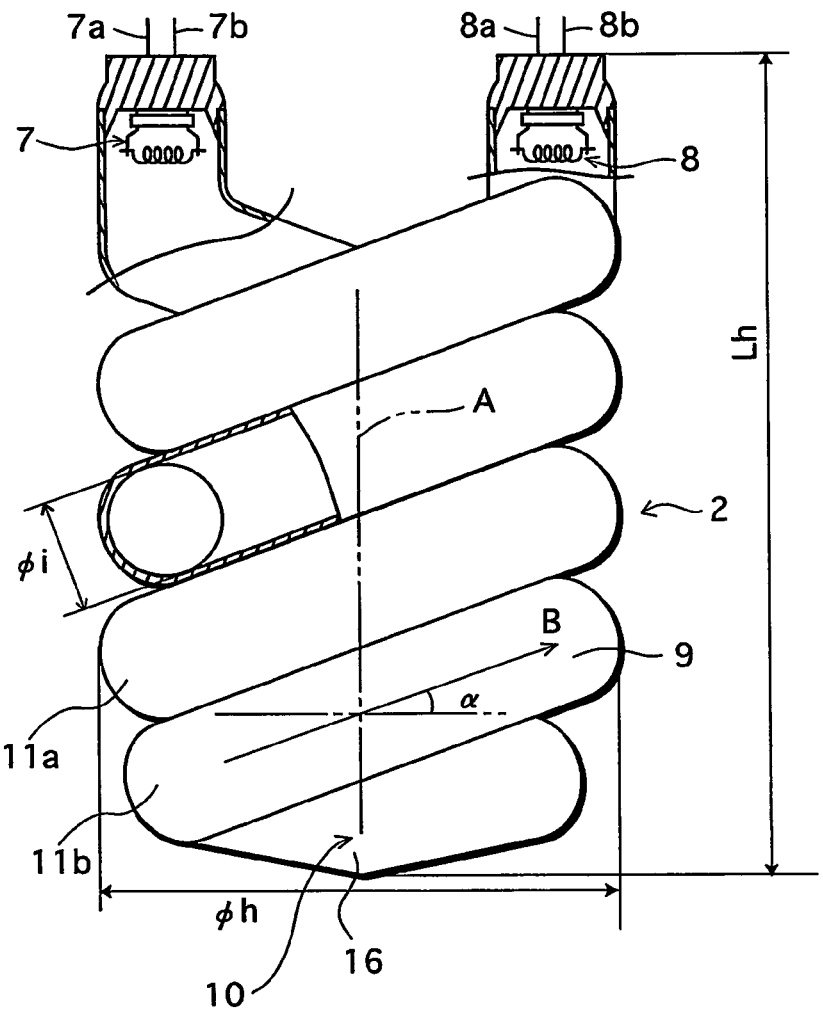
FIG. 2A is a front view showing the construction of an arc tube according to the first embodiment, partially cut away to show its inside.
Figure 2B:
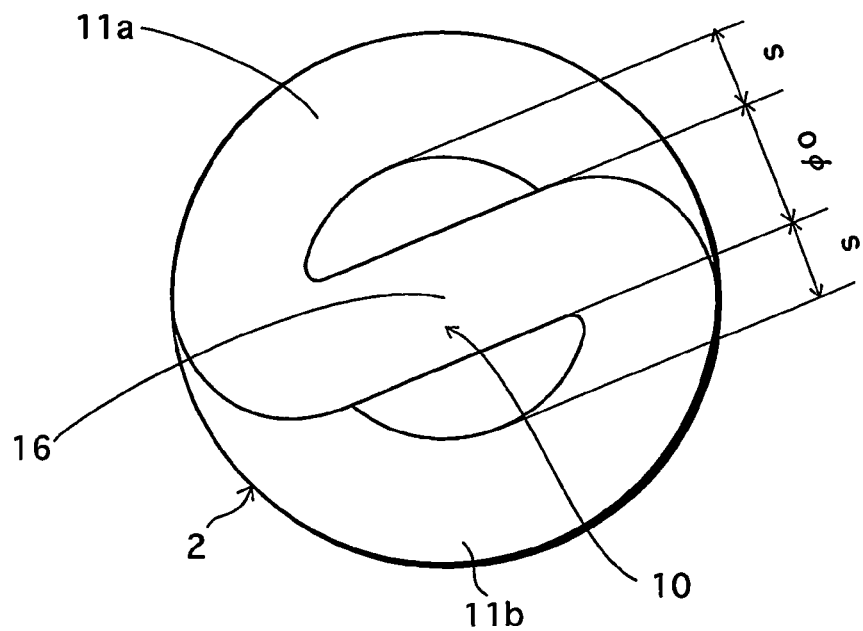
FIG. 2B is a bottom view of the arc tube according to the first embodiment.

FIG. 2A is a front view showing the construction of the arc tube 2, partially cut away to show its inside. FIG. 2B is a bottom view of the arc tube 2 as viewed from below. The arc tube 2 is positioned to extend from an opening of the case 4 downward (opposite side to the base 5). The glass tube 9 forming the arc tube 2 is turned back at a turning part 10 provided in the substantially middle between its both ends, so that the both ends are positioned at the side where the case 4 is positioned.

The glass tube 9 has a double-spiral structure that is made up of a first spiral part 11a starting from one end of the glass tube 9 and winding around the axis "A" toward the turning part 10 at the bottom, and a second spiral part 11b starting from the turning part 10 and winding around the axis "A" toward the other end of the glass tube 9. The first and second spiral parts 11a and 11b together are wound around the axis "A" by about five winds.

It should be noted here that the state where the glass tube 9 is formed into a double-spiral structure by winding it around the axis "A" is expressed using the number of winds, e.g, "five winds". It should also be noted here that the glass tube 9 is wound around the axis "A" at a predetermined angle with the horizontal direction (a direction perpendicular to the axis "A") (this angle is hereafter referred to as a "spiral angle").

Here, the spiral structure is chosen for the arc tube 2 due to the following reason. The arc tube 2 having the spiral structure can have a longer distance between a pair of electrodes (electrode distance) than a conventional U-shape arc tube. In other words, the arc tube 2 having the spiral structure can have a longer discharge path than a conventional U-shape arc tube, and accordingly, can be made more compact as a whole.

Electrodes 7 and 8 are sealed respectively at both ends of the glass tube 9. As these electrodes 7 and 8, coil electrodes made of tungsten are used. These electrodes 7 and 8 are inserted in the glass tube 9 with being temporarily fixed using bead glass. Lead wires 7a, 7b, 8a, and 8b for the electrodes 7 and 8 are bonded to the glass tube 9. In this way, the glass tube 9 is hermetically sealed.

Within the hermetically sealed glass tube 9, mercury is enclosed in a single form by an amount of about 5 mg, and also, an argon and neon gas is enclosed as a buffer gas. Here, a rare-earth phosphor is applied to the inner surface of the glass tube 9. A phosphor used here is a mixture of three types of phosphors respectively emitting red, green, and blue light, e.g., $Y_2O_3$:Eu, $LaPO_4$:Ce, Tb, and $BaMg_2, Al_{16}O_{27}$:Eu and Mn phosphors.

The present embodiment assumes that mercury is enclosed within the glass tube 9 in such a form that can exhibit, at the time of lighting operation of the arc tube 2, mercury vapor pressure characteristics being substantially the same as mercury vapor pressure characteristics exhibited by mercury enclosed within the glass tube 9 in the single form. In the manufacturing process of the arc tube 2, therefore, mercury enclosed may be in the single form, or may be in another form, such as the form of an alloy containing zinc, as long as it can exhibit at the time of lighting operation mercury vapor pressure characteristics being substantially the same as mercury vapor pressure characteristics exhibited by mercury in the single form. It should be noted here that a mercury vapor pressure of an alloy (amalgam) is a vapor pressure exhibited by mercury vaporized when the lamp is lit.

The arc tube 2 is held by the holder 12 by fixing its one end at the side of the electrodes 7 and 8 to the bottom surface of the holder 12. As shown in FIG. 1, electric components 13 for lighting the arc tube 2 are attached to the back side of the holder 12. These electric components 13 constitute the ballast circuit 3 for lighting the arc tube 2.

The case 4 is made of a synthetic resin and is in a tubular shape having a larger diameter as closer to its bottom end as shown in FIG. 1. The holder 12 is placed in the opening of the case 4 so that the side of the holder 12 where the ballast circuit 3 is provided is positioned back within the case 4. A peripheral part of the holder 12 is fixed to the inner wall of the case 4 via an appropriate fixing means such as an adhesive and a screw. The E26 type base 5 is attached to the top end of the case 4, which is the opposite side to the opening of the case 4. It should be noted here that electrical coupling between the arc tube 2 and the ballast circuit 3, and electrical coupling between the base 5 and the ballast circuit 3 are not shown in FIG. 1.

The globe 6 is provided to cover the arc tube 2. An opening of the globe 6 is placed inside the opening of the case 4, and an end of the globe 6 at the opening side is fixed to the inner wall of the case 4 at its opening via an appropriate fixing means such as an adhesive and a screw. The globe 6 and the case 4 constitute an envelope. Hereafter, an outer diameter of the lamp 1, i.e., an outer diameter of the globe 6, is assumed to be the lamp diameter "φ", and a total length of the lamp 1, i.e., a total length of the envelope including the base 5 of the case 4, is assumed to be the lamp length "L". The globe 6 in the present embodiment is made of glass, and is in the "A" shape.

A bottom end part of the globe 6 at its inner wall and a bottom end part (at the side of the turning part 10) of the arc tube 2 are thermally connected with each other via a heat-conductive member 15. With this construction, even if the temperature of the arc tube 2 increases when the lamp 1 is lit, heat in the arc tube 2 is conducted to the globe 6 via the heat-conductive member 15. Accordingly, an increase in the temperature of the arc tube 2, in particular an increase in the temperature of the bottom end part of the arc tube 2 can be suppressed.

The following are the reasons why an increase in the temperature of the bottom end part of the arc tube 2 can be suppressed. A mercury vapor pressure in the arc tube 2 can be effectively decreased by lowering the temperature of the coolest part of the arc tube 2. In the case of the spiral arc tube 2 in the present embodiment, a part of the arc tube 2 that is the most distant from the electrodes 7 and 8, i.e., the bottom end part of the arc tube 2, is the coolest part of the arc tube 2. It should be noted here that this coolest part of the arc tube 2 corresponds to the turning part 10 of the glass tube 9.

Examples of the heat-conductive member 15 include metal, synthetic resin, and rubber. Here, it is preferable that the heat-conductive member 15 has high light transmissivity, considering that light emitted from the arc tube 2 is discharged, via the heat-conductive member 15, from the globe 6 to outside, particularly in the downward direction. Further considering an increase in the temperature of the arc tube 2, it is preferable that the heat-conductive member 15 has high heat resistance. A specific material chosen by considering these factors is a transparent silicone resin.

2) Specific Construction

The following describes the specific construction and dimensions employed in the present embodiment.

As shown in FIGS. 1, 2A, and 2B, the glass tube 9 forming the arc tube 2 has the tube inner diameter "φi" of 7.4 mm and the tube outer diameter "φo" of 9.0 mm. In the arc tube 2, the electrode distance is 340 mm. The arc tube 2 is formed to have a spiral structure in which the glass tube 2 is wound around the axis "A" by about five winds. The arc tube 2 has the outer diameter "φh" of 36 mm, and the length "Lh" of 64 mm.

As shown in FIG. 2B, a distance "S" between the turning part 10 of the glass tube 9 and each of the first spiral part 11a and the second spiral part 11b that are turned back at the turning part 10 and are positioned at the bottom is 4.5 mm, which is a value calculated using the tube outer diameter "φo" of the glass tube 9 being 9.0 mm. Therefore, a ratio of (a) non light-emitting areas (gaps formed between the turning part 10 and each of the first and second spiral parts 11a and 11b) to (b) light emitting areas (the spiral parts 11a and 11b, and the turning part 10) shown in the bottom view of the arc tube 2 is small. Accordingly, substantially uniform luminous distribution can be obtained, and further, vertical illuminance, which is illuminance from the bottom end part of the arc tube 2 in the vertical direction, can be enhanced.

The globe 6 has the outer diameter "φ" of 55 mm and the length "Lb" of 58 mm. The globe 6 is provided to cover the arc tube 2. The length "Lh" of the arc tube 2 (64 mm) is longer than the length "Lb" of the globe 6 (58 mm) (see FIG. 1) because the holder 12 holding the arc tube 2 is attached to the case 4 as being partially inserted in the case 4.

The lamp 1 has the lamp diameter "φ" of 55 mm and the lamp length "L" of 110 mm. Comparing with a 60 W incandescent lamp for general lighting having the lamp diameter of 60 mm and the lamp length of 110 mm, the lamp 1 has the lamp diameter being 5 mm smaller and the lamp length being equivalent. This means that the lamp 1 is more compact than the 60 W incandescent lamp.

The following describes performances of the lamp 1 with the above-described construction.

The lamp 1 was lit with the base 5 being oriented upward by applying the input power of 11 W. According to the measurement results for the lamp 1, the luminous flux rising characteristics at the lamp startup were equivalent to those of a conventional fluorescent lamp for general lighting. Also, at the lamp current of about 75 mA, the luminous flux was 790 lm, and the luminous efficiency was 71.9 lm/W, which is higher than the targeted luminous efficiency of 70 lm/W. Further, the lamp life of 6000 hours or more was confirmed.

3) Manufacturing Method for Arc Tube

Figure 4A:
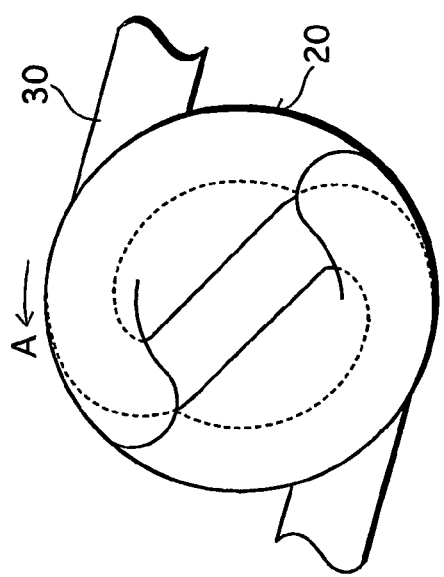
FIGS. 4A to 4C are plan views showing the process of winding the glass tube around the mandrel to shape the arc tube according to the first embodiment.
Figure 4B:
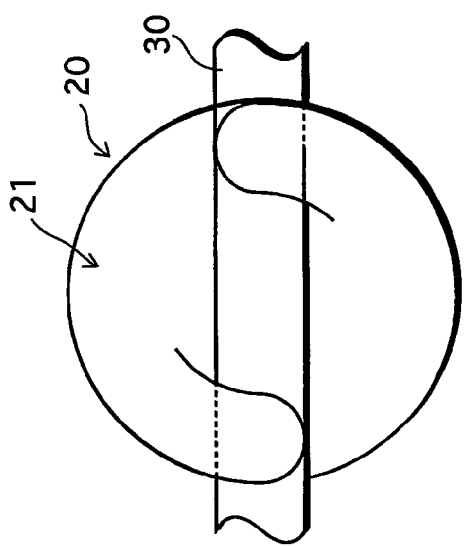
Figure 4C:
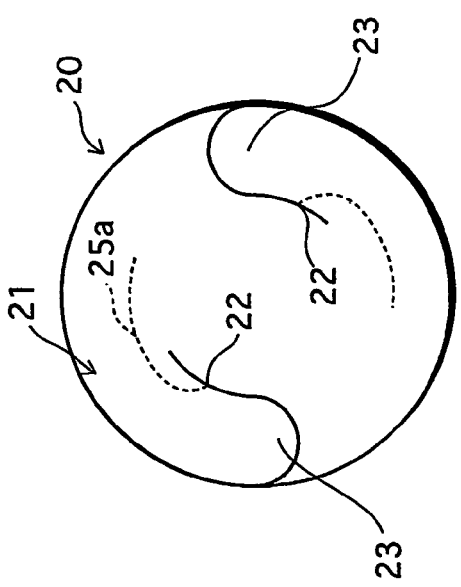

The following describes a manufacturing method for the arc tube 2. FIGS. 3A to 3C and FIGS. 4A to 4C are drawings for explaining the process of manufacturing a double-spiral arc tube using a mandrel. FIGS. 3A to 3C are front views of the mandrel. FIGS. 4A to 4C are top views of the mandrel.

First, a mandrel 20 is set ready as shown in FIGS. 3A and 4A. As shown in FIG. 3A, the mandrel 20 is in a cylindrical shape and has a groove 25 at its outer surface. The groove 25 is in a double-spiral shape extending from a top of the mandrel 20 toward a bottom of the mandrel 20 (a bottom end part of the mandrel 20).

At the top 21 of the mandrel 20 that is one end (top end) thereof, two turn-forming parts 22 for forming the turning part 10 of the arc tube 2, and two stopper parts 23 for preventing the glass tube 30 from being deviating from the mandrel 20 at the time of winding are symmetrically provided with respect to the center of the top 21 of the mandrel 20 (a point on the axis of the mandrel 20) (see FIG. 4A). It should be noted here that a reference numeral 25a in FIGS. 3A and 4A indicates a bottom surface of the groove 25 (to be an inner circumference of a spiral arc tube). The turn-forming parts 22 are positioned at one end of the bottom surface 25a at the side of the top 21 in the spiral direction.

At the bottom of the mandrel 20 that is the other end (bottom end) thereof, an attaching part 24 is provided for attaching the mandrel 20 to a driving device. It should be noted here that the driving device has the function of moving the mandrel 20 in the axis direction while rotating it around the axis.

Next, the glass tube 30 that is straight and has a circular-shaped cross section is set ready. A middle part of the glass tube 30 is heated so as to be softened. As shown in FIGS. 3B and 4B, the softened glass tube 20 is placed in such a manner that its substantially middle part is between the two turn-forming parts 22 at the top 21 of the mandrel 20. Then, as shown in FIGS. 3C and 4C, the mandrel 20 that is holding both ends of the glass tube 30 is moved in direction "X" while being rotated around the axis in direction "A". This results in the softened glass tube 30 being wound around the mandrel 20 along the spiral groove 25. It should be noted here that a distance by which the mandrel 20 is moved in direction "X" per single rotation is controlled so as to match one pitch of the spiral shape of the groove 25.

The groove 25 has an arc-shaped cross section, for the purpose of enabling the glass tube 30 that has been wound up to have a circular-shaped cross section. Also, during winding of the glass tube 30, a gas such as nitrogen whose pressure is controlled is being blown into the glass tube 30. It should be noted here that a gas may be blown into the glass tube 30 after the glass tube 30 is wound around the mandrel 20 along the groove 25. Also, instead of a gas such as nitrogen blown into the glass tube 30 described in the present embodiment, a liquid, such as water and butyl acetate, may be injected into the glass tube 30.

When the winding of the glass tube 30 is completed and the glass tube 30 is cooled down, the mandrel 20 is rotated in the direction opposite to the winding direction (the direction opposite to direction "A"), so that the glass tube 30 can be detached from the mandrel 20. By rotating the mandrel 20 in the direction opposite to direction "A" shown in FIG. 3, the glass tube 30 can be easily detached from the mandrel 20.

2. Examination Matters

In examining the globe-type lamp 1, the inventors have set the four specific goals:

1) To improve the luminous flux rising characteristics at the lamp startup (in detail, the targeted luminous flux of three seconds after lighting at a room temperature of 25° C. is 60% of the luminous flux at steady lighting) so as to be equivalent to those of a fluorescent lamp for general lighting;

2) To make the lamp 1 as compact as or more compact than an incandescent lamp, in particular, a 60 W incandescent lamp having the lamp diameter "φ" of 60 mm and the lamp length "L" of 110 mm;

3) To improve the luminous efficiency so as to be 70 lm/W or more, which is higher than the luminous efficiency of a conventional lamp being 68 lm/W; and 4) To improve the lamp life so as to be 6000 hours or more as specified by JEL201 (Japan Electric Lamp Manufactures Association).

In an effort to achieve these four goals, the inventors examined various methods for suppressing degradation of the luminous efficiency during lighting of the lamp in which mercury is enclosed within the arc tube 2 not in the form of an amalgam but in the single form.

1) Tube Inner Diameter

The luminous efficiency is said to be degraded during lighting due to the following reason. A mercury vapor pressure within the arc tube increases as the temperature of the arc tube increases. Accordingly, the number of mercury atoms present in a discharge space increases, and ultraviolet light emitted from one mercury atom is absorbed by another mercury atom. As a result, the luminous efficiency is degraded. Considering this, the inventors first thought of shortening an optical path on which ultraviolet light emitted from mercury atoms travels to the tube wall (inner circumference) of the arc tube. By doing so, the inventors thought that an amount of ultraviolet light absorbed by mercury atoms could be reduced. In other words, by shortening the tube inner diameter "φi" of the glass tube 9 forming the arc tube 2, the inventors thought that the degradation of the luminous efficiency could be suppressed.

Then, the inventors carried out experiments for determining a mercury vapor pressure that can achieve the maximum luminous efficiency at each of various values for the tube inner diameter "φi" of the glass tube 9 ranging from 5 to 12 mm. To be more specific, the inventors manufactured lamps each varying in the tube inner diameter "φi" by 1 mm from 5 to 12 mm, and carried out the experiments using these lamps. Here, values ranging from 5 to 12 mm were chosen for the tube inner diameter "φi" due to the following reason. When the tube inner diameter "φi" is 5 mm or less, placing the electrodes 7 and 8 in the arc tube 2 is difficult. On the other hand, when the tube inner diameter "φi" is 12 mm or more, the arc tube 2 becomes large in size, thereby failing to make the lamp 1 compact.

Further, the electrode distance "Le" corresponding to the tube inner diameter "φi" is determined at such a value that enables the tube wall load "we" of the arc tube 2 to be 0.16 W/cm$^2$, using data collected using conventional lamps. The inner-electrode distance "Le" is determined at such a value because the inventors' examination results relating to the lamp life characteristics ensure that the lamp life of about 6000 hours can be achieved for the lamp 1 when the tube wall load "we" is 0.16 W/cm$^2$. The tube wall load "we" can be obtained by dividing the arc tube input by the surface area "π×φi×Le" of the inner circumference of the arc tube 2. Here, the arc tube input is calculated by multiplying the input power (11 W) and the circuit efficiency (0.91) of the ballast circuit 3.

In the experiments, a non globe-type lamp was placed in a thermostat, and a mercury vapor pressure in an arc tube was made varied. To be more specific, an ambient temperature in the thermostat was set at various values so as to variously change the mercury vapor pressure within the arc tube. Then, such a temperature at which the arc tube achieved the maximum luminous flux (hereafter referred to as "maximum luminous-flux temperature "T"") was measured. It should be noted here that such a mercury vapor pressure at which the arc tube achieves the maximum luminous flux is referred to as an "optimum mercury vapor pressure".

Figure 5:
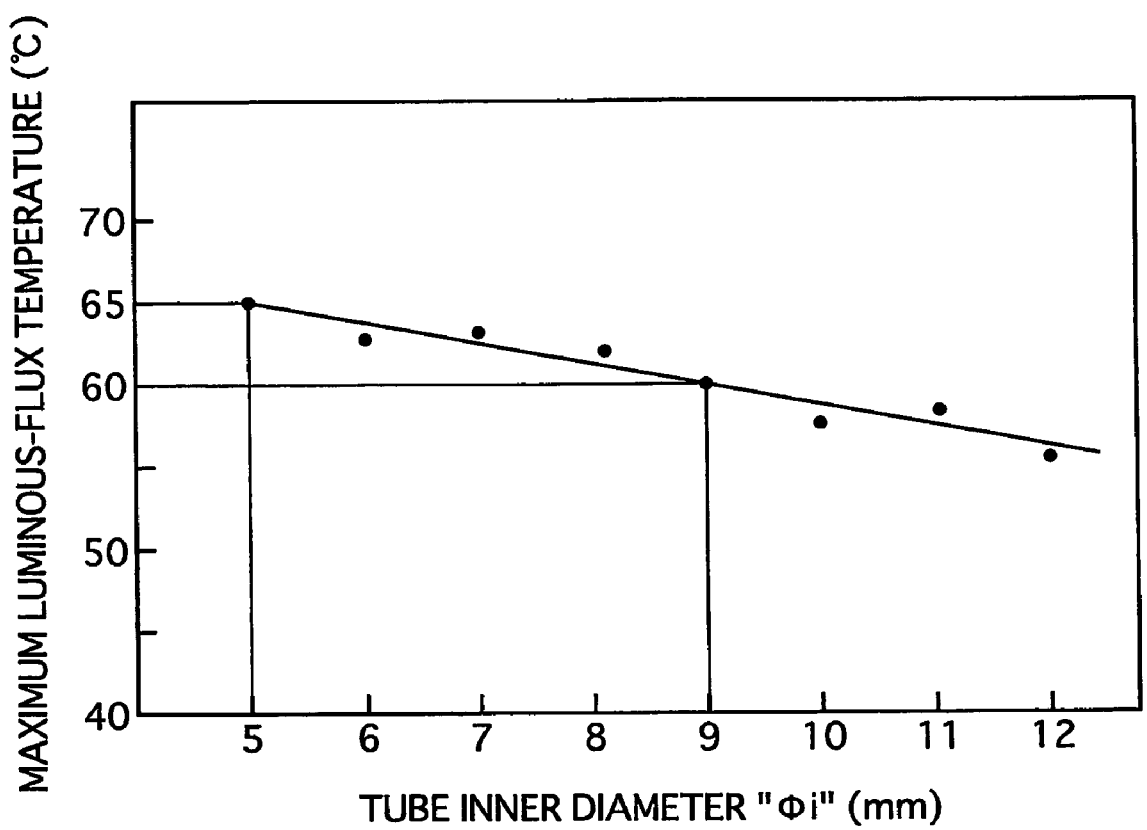
FIG. 5 shows the relationship between the maximum luminous-flux temperature and the tube inner diameter of the glass tube.

The experimental results are shown in FIG. 5. As shown in the figure, the maximum luminous-flux temperature "T" increases as the tube inner diameter "φi" decreases. In particular, when the tube inner diameter "φi" is as small as 5 mm, the maximum luminous-flux temperature "T" is as high as 65° C.

The experimental results indicate the following. If the temperature of a part of the arc tube 2 whose temperature is the lowest (hereafter referred to as the "coolest-point temperature"), i.e., the temperature of the bottom part of the arc tube 2, is substantially the same as the maximum luminous-flux temperature, degradation of the luminous efficiency does not occur during lighting. Here, the coolest-point temperature and the maximum luminous-flux temperature are compared because the maximum luminous-flux temperature is such a temperature that corresponds to a mercury vapor pressure at which the arc tube 2 achieves the maximum luminous flux (optimum mercury vapor pressure), and also a mercury vapor pressure in the arc tube 2 depends on the coolest-point temperature of the arc tube 2.

2) Temperature of the Arc Tube

The inventors examined various methods for lowering the coolest-point temperature of the arc tube 2 during lighting. As long as such a method is available for lowering the coolest-point temperature of the arc tube 2 during lighting to 65° C. or lower, degradation of the luminous efficiency during lighting can be suppressed simply by reducing the tube inner diameter "φi" of the arc tube 2.

As preliminary examinations, the inventors manufactured the lamp 1 including the arc tube 2 formed by the glass tube 9 with the tube inner diameter "φi" of 7.4 mm, the tube outer diameter "φo" of 9.0 mm, and the electrode distance "Le" of 340 mm. The lamp 1 has substantially the same dimensions as a 60 W incandescent lamp (with the lamp diameter "φ" of 60 mm and the lamp length "L" of 110 mm). Then, the lamp 1 was lit by applying the input power of 11 W. The temperature of the arc tube 2 and the globe 6 was measured. Is should be noted here that the lamp 1 was lit with the base being oriented upward. It should also be noted here that the globe 6 was of an A-type that is the same as for the 60 W incandescent lamp.

According to the measurement results for the arc tube 2, the temperature of the bottom end part was about 75° C., which was the coolest in the arc tube 2. That is to say, the coolest point was formed in the bottom end part of the arc tube 2. The experimental results indicate the following. If the coolest-point temperature of the arc tube 2 can be lowered by 10° C. or more, the coolest-point temperature of the arc tube 2 during lighting and the maximum luminous-flux temperature "T" that can achieve the maximum luminous flux can be made substantially the same.

On the other hand, the temperature of the bottom end part of the globe 6 opposing to the coolest point of the arc tube 2 was about 50° C. A temperature difference between the bottom end part of the arc tube 2 and the bottom end part of the globe 6 was about 25° C.

Here, the inventors thought that the temperature of the arc tube 2 could be lowered by conducting heat in the arc tube 2 during lighting to the globe 6 covering the arc tube 2. The inventors chose the method of thermally connecting the coolest point 16 of the arc tube 2 to the globe 6 opposing to the coolest point 16 via a heat-conductive member as shown in FIG. 1, and examined such effective ways.

As the heat-conductive member 15, the inventors tried to find a material that has a high heat resistance and high light transmissivity as describe above, and chose a transparent silicone resin as this material. The transparent silicone resin does not spoil the appearance of the lamp 1, nor cause such a problem that the silicone resin appears on the globe 6 as a shade during lighting.

A distance "d" between the bottom end part of the arc tube 2 and the bottom end part of the globe 6 at its inner wall (see FIG. 1) is set at 2 mm, and the bottom end part of the arc tube 2 is partially embedded in the silicone resin by about 2 mm.

Here, the inventors found that as to the lamp 1 used for the above measurements, a degree of the coolest-point temperature being lowered could be reduced by setting the distance "d" above 6.0 mm. Accordingly, the distance "d" is to be set at 6.0 mm or less.

In view of the heat conductivity, it might seem preferable to eliminate the distance "d" between the bottom end part of the arc tube 2 and the bottom end part of the globe 6, so that heat can be conducted directly from the bottom end part of the arc tube 2 to the globe 6. However, the arc tube 2 and the globe 6 are both made of glass. If any load, such as impact load, acts on the lamp 1 when the lamp 1 is delivered or when the lamp 1 is loaded into a lighting apparatus or the like, the arc tube 2 and the globe 6 may be damaged. Accordingly, it is preferable that a certain space is provided between the arc tube 2 and the globe 6. The space provided is filled with a silicone resin, and therefore, even if the load acts on the lamp 1 as described above, the load can be absorbed by the silicone resin to a certain degree.

The lamp 1 with the above-described construction was lit, and the coolest-point temperature at the bottom end part of the arc tube 2 was measured. According to the measurement results, the coolest-point temperature was 63° C., which is about 12° C. lower than that for a lamp for which a silicone resin is not used (the coolest-point temperature: 75° C.) in the above preliminary examinations.

The experimental results indicate the following. By connecting the bottom end part of the arc tube 2 and the bottom end part of the globe 6 via a silicone resin, the coolest-point temperature at the bottom end part of the arc tube 2 can be fallen within a range of 60 to 65° C. When the coolest-point temperature is in this range of 60 to 65° C., a range of values for the tube inner diameter "φi" that can achieve the maximum luminous flux of the arc tube 2 is 5.0 to 9.0 mm.

3) Compactness and Luminous Efficiency

Figure 6:
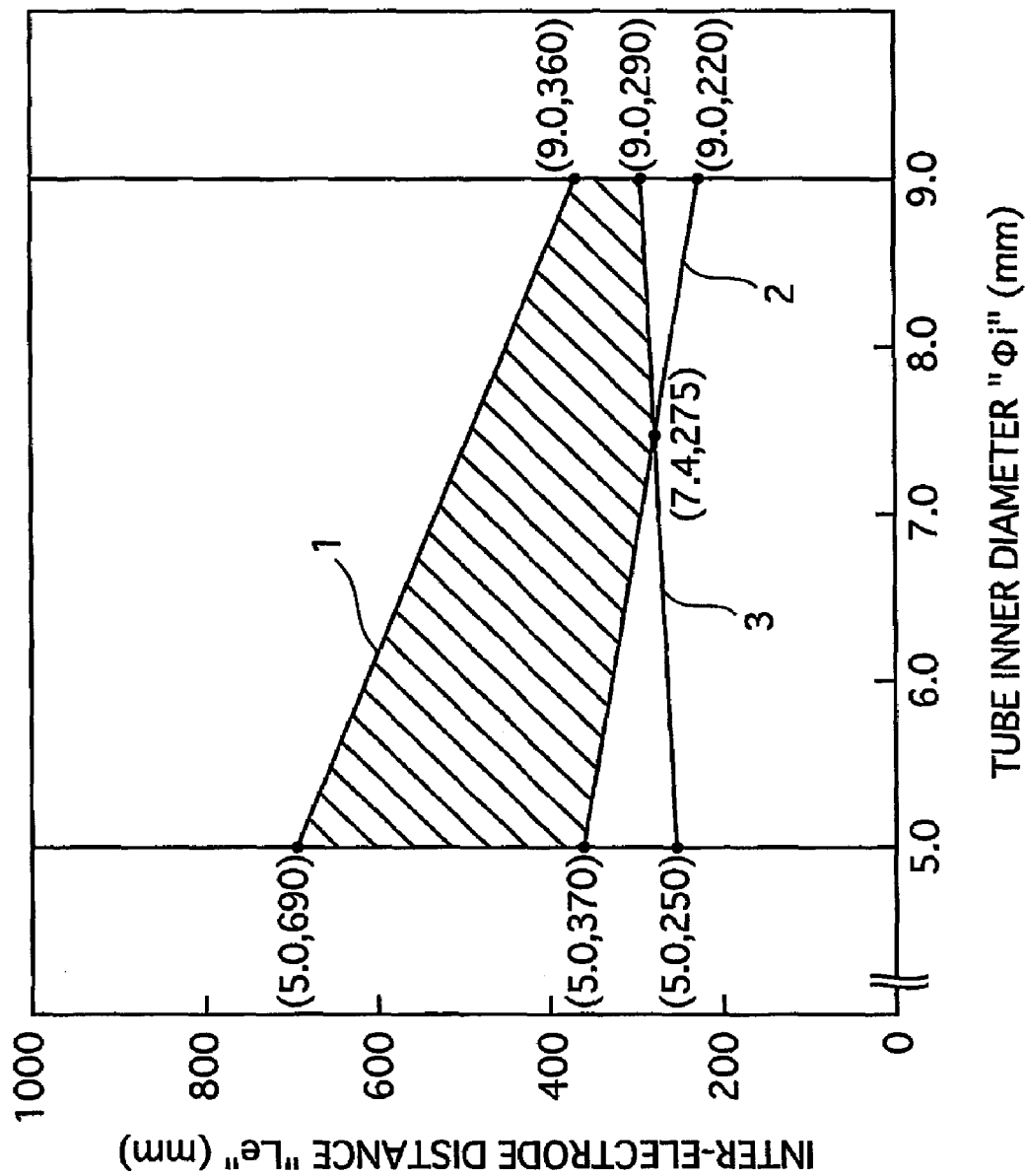
FIG. 6 shows the relationship between the tube inner diameter of the glass tube and the electrode distance of the arc tube as an alternative to a 60 W incandescent lamp.

For the above lamp 1 including the arc tube 2 formed by the glass tube 9 with the tube inner diameter set small as in the above range, and in which a silicone resin is provided as described above, the inventors examined methods for fulfilling the remaining goals of making the lamp as compact as a 60 W incandescent lamp, achieving the luminous efficiency of 70 lm/W or more, and achieving the lamp life of 6000 hours or more. The examination results are shown in FIG. 6. According to the examination results, the lamp 1 that can fulfill the above goals can be obtained by setting the tube inner diameter "φi" and the electrode distance "Le" of the arc tube 2 in a range indicated by a shaded area in FIG. 6. The following describes the results shown in FIG. 6 and the reasons why the above goals can be obtained.

a) Making the Lamp More Compact

The line "1" in FIG. 6 is a line plotting the maximum electrode distance for each tube inner diameter within a range where the electrodes can be placed in the arc tube 2 in the globe 6 corresponding to the size of a 60 W incandescent lamp. As can be seen from the figure, to make the lamp more compact, the electrode distance "Le" is to be set shorter so as to downsize the arc tube 2. Therefore, the maximum length of the arc tube 2 that can be placed in the globe 6 (with the outer diameter "φ" of 55 mm and the length "Lb" of 58 mm) corresponding to the size of the incandescent lamp is to be calculated first. Then, the maximum electrode distance "Le" for the calculated maximum length of the arc tube 2 can be obtained. It should be noted here that values on the line "1" are maximum values for the electrode distance "Le".

b) Lamp Life

The line "2" in FIG. 6 is a line plotting the electrode distance "Le" for each tube inner diameter of the lamp that can achieve the lamp life of 6000 hours or more. To ensure the lamp life of 6000 hours or more, the inventors' examinations relating to the lamp life characteristics reveal that the tube wall load "we" of the arc tube 2 is to be set at 0.16 W/cm$^2$ or less.

c) Luminous Efficiency

The line "3" in FIG. 6 is a line plotting the electrode distance "Le" for each tube inner diameter of the lamp that can achieve the luminous efficiency of 70 lm/W. The values for the electrode distance "Le" on the line "3" have been obtained by experiments, and are such values that can achieve the luminous efficiency of 70 lm/W. To be more specific, the inventors prepared the arc tubes 2 formed by the glass tubes 9 varying in the tube inner diameter from 5.0 to 9.0 mm. For the arc tube 2 having each tube inner diameter, the electrode distance "Le" was set at a different value. Lamps employing these prepared arc tubes 2 were lit, and the luminous flux of each lamp was measured. In this way, the electrode distance "Le" that can achieve the luminous efficiency of 70 lm/W was obtained.

4) Conclusions

From the above examinations, the construction of the lamp 1 according to the present embodiment can be concluded as follows. In the arc tube 2, mercury is enclosed not in the form of an amalgam but in the single form. The tube inner diameter "φi" of the glass tube 9 forming the arc tube 2 is set in a range of 5.0 to 9.0 mm. The bottom end part of the arc tube 2 and the bottom end part of the globe 6 at its inner wall is connected via a silicone resin so as to allow heat conduction.

As described above, mercury is enclosed within the arc tube 2 in the single form, and therefore, the luminous flux rising characteristics equivalent to those of the fluorescent lamp for general lighting can be obtained. Also, by setting the tube inner diameter "φi" in a range of 5.0 to 9.0 mm, the temperature at which the lamp achieves the maximum luminous flux can be fallen within a range of 60 to 65° C. (see FIG. 5). Therefore, even if the temperature of the arc tube 2 increases during lighting, a difference between the temperature of the arc tube 2 and the temperature at which the maximum luminous flux is obtained can be narrowed, thereby enabling degradation of the luminous efficiency to be suppressed. Further, by reducing the tube inner diameter "φi", the electrode distance "Le" can be lengthened, thereby enabling the luminous efficiency to be improved.

Further, by connecting the arc tube 2 and the globe 6 via a silicone resin, heat generated in the arc tube 2 during lighting can be conducted to the globe 6, and so the temperature of the arc tube 2 can be lowered.

Particularly as an alternative to a 60 W incandescent lamp, by setting the electrode distance "Le" of the arc tube 2 in a range indicated by the shaded area shown in FIG. 6, the lamp 1 can be made as compact as or even more compact than a 60 W incandescent lamp, and also can exhibit the luminous efficiency of 70 lm/W or more and the lamp life of 6000 hours or more.

Second Embodiment

In the present embodiment, the present invention is applied to a 21 W lamp that is an alternative to a 100 W incandescent lamp, whereas in the first embodiment the present invention is applied to a 11 W lamp that is an alternative to a 60 W incandescent lamp. To differentiate a lamp according to the present embodiment from the lamp 1 according to the first embodiment, components of the lamp according to the present embodiment are given reference numerals 2--. As one example, the lamp according to the present embodiment is given reference numeral 201. Though being given reference numerals, some components are not shown in the figures (e.g., the lamp 201 and the globe 206).

The following describes the basic construction of a 100 W incandescent lamp to which the lamp 201 according to the present embodiment aims to be an alternative. A 100 W incandescent lamp for general lighting has the lamp diameter "φ" of 60 mm and the lamp length "L" of 110 mm.

A conventional 22 W lamp that has been an alternative to this 100 W incandescent lamp has the lamp diameter "φ" of 65 mm and the lamp length "L" of 140 mm. This means that the conventional 22 W lamp has the lamp diameter "φ" about 5 mm larger and the lamp length "L" about 30 mm longer than the 100 W incandescent lamp. It should be noted here that the conventional 22 W lamp has the luminous flux of 1520 lm and the luminous efficiency of 69.1 lm/W.

1. Construction

Figure 7:
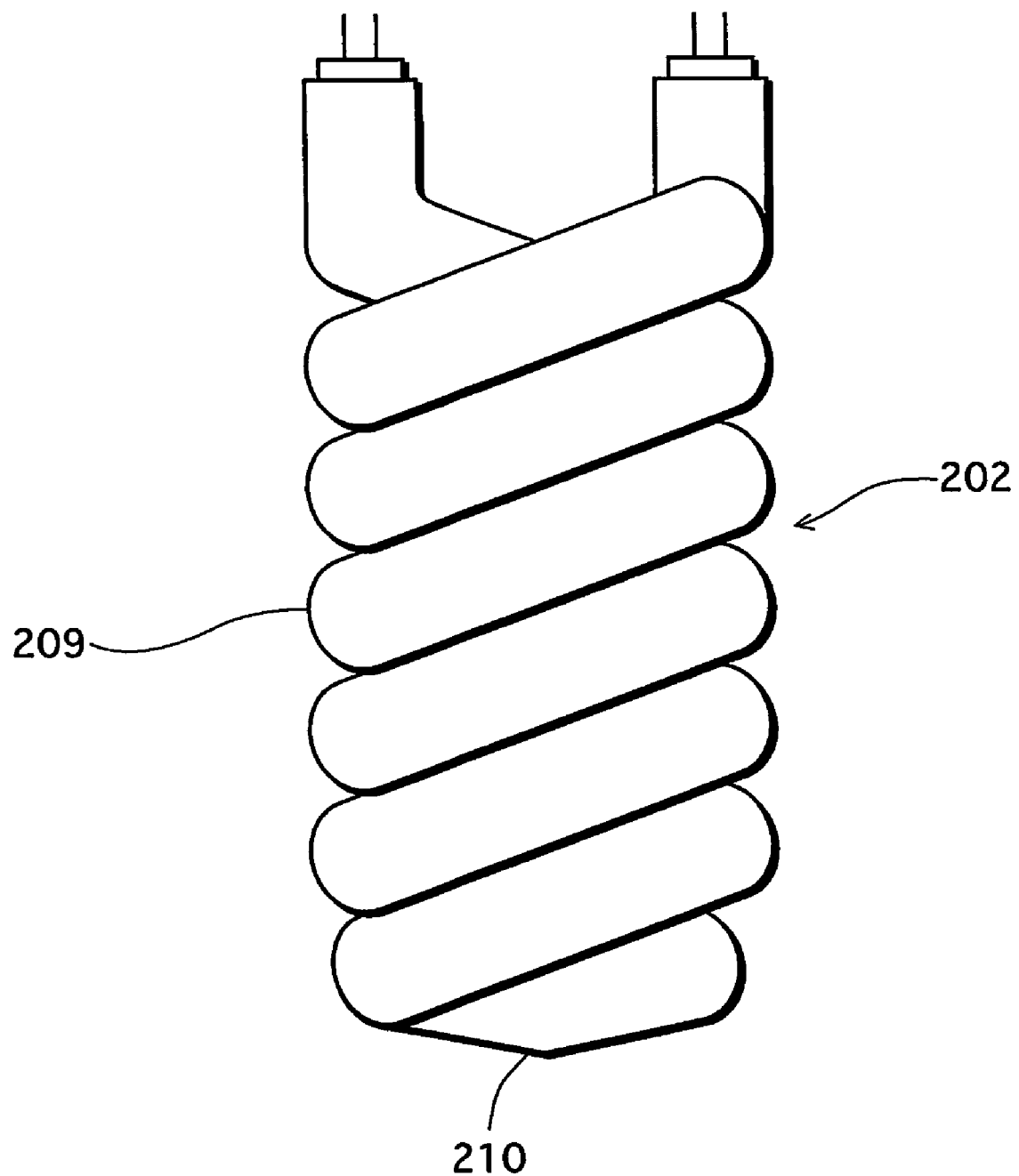
FIG. 7 is a front view of an arc tube according to a second embodiment of the present invention.

FIG. 7 is a front view showing the overall construction of an arc tube 202 according to the present embodiment. The lamp 201 according to the present embodiment has the same basic construction as the lamp 1 according to the first embodiment, with the only difference being in the following point. As being an alternative to the 100 W incandescent lamp, the input power for the lamp 201 is 21 W, which is larger than the input power 11 W for the lamp 1. Also, to obtain the luminous flux substantially equivalent to that of the 100 W incandescent lamp, the electrode distance in the arc tube 202 of the lamp 201 is set longer than that in the lamp 1. For the lamp 201, therefore, the arc tube 201 has a spiral structure including about seven winds as shown in FIG. 7, whereas for the lamp 1 the spiral structure includes about five winds.

It should be noted here that the tube inner diameter "φi" of a glass tube 209, too, is set in a range of 5.0 to 9.0 mm inclusive, for the same reasons as stated in the first embodiment.

Here, the following describes the specific construction and dimensions employed in the present embodiment.

The arc tube 202 is formed by the glass tube 209 having the tube inner diameter "φi" of 7.4 mm and the tube outer diameter "φo" of 9.0 mm, and the electrode distance "Le" is set at 640 mm. The glass tube 209 is formed to have a spiral structure including about 7 winds. The arc tube 202 has the outer diameter "φh" of 36 mm and the length "Lh" of 85 mm. The globe 206 has the outer diameter "φ" of 60 mm and the length "Lb" of 80 mm.

As for the overall dimensions of the lamp 201, the lamp diameter "φ" is 60 mm and the lamp length "L" is 128 mm, meaning that the lamp 201 is more compact than the conventional 22 W lamp (with the lamp diameter "φ" of 65 mm and the lamp length "L" of 140 mm). To be specific, the lamp 201 has the lamp diameter "φ" being 5 mm smaller and the lamp length "L" being 12 mm shorter than the conventional 22 W lamp.

The following describes performances of the lamp 201 with the above-descried construction.

The lamp 201 was lit with the base being oriented upward by applying the input power of 21 W. According to the measurement results for the lamp 201, the luminous flux rising characteristics at the lamp startup were equivalent to those of a conventional fluorescent lamp for general lighting. Also, at the lamp current of about 100 mA, the luminous flux was 1520 lm, and the luminous efficiency was 72.4 lm/W, which is higher than the targeted luminous efficiency of 70 lm/W. Further, the lamp life of 6000 hours or more was confirmed.

2. Examination Matters

In the present embodiment, the dimensions of the lamp 201 are set in the following way, for the purpose of achieving the goal of making the lamp 201 more compact than the conventional 22 W lamp. The lamp diameter "φ" is set in a range of 60 to 65 mm, which is smaller than the lamp diameter "φ" of 65 mm of the conventional 22 W lamp. The lamp length "L" is set in a range of 120 to 135 mm, which is shorter than the lamp length "L" of 140 mm of the conventional 22 W lamp. As in the first embodiment, the goal is set to achieve the target luminous efficiency of 70 lm/W for the lamp 201, which is not less than that of the conventional 22 W lamp (69 lm/W) Also, as in the first embodiment, the goal is set to achieve the lamp life of 6000 hours or more for the lamp 201.

Figure 8:
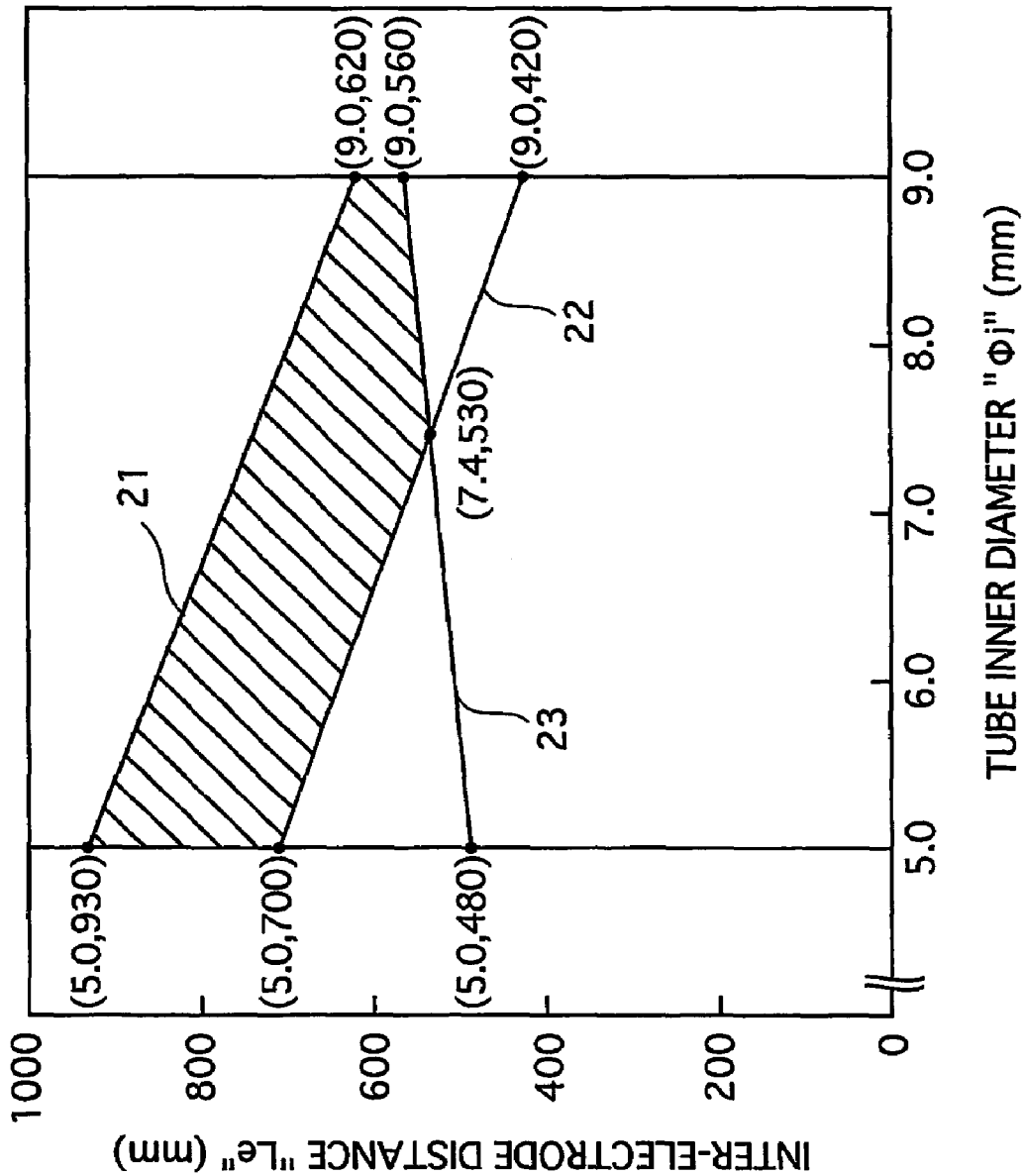
FIG. 8 shows the relationship between the tube inner diameter of the glass tube and the electrode distance of the arc tube as an alternative to a 100 W incandescent lamp.

As in the first embodiment, the inventors prepared a number of lamps 201 each varying in the tube inner diameter "φ" of the glass tube 209 and the electrode distance "Le" in the arc tube 202, and carried out measurements of these lamps, to find out values that can satisfy the above goals of making the lamp more compact, improving the luminous efficiency, and ensuring the lamp life. The measurement results are shown in FIG. 8. When the relationship between the tube inner diameter "φi" and the electrode distance "Le" is within a range indicated by a shaded area in FIG. 8, the lamp 201 that can satisfy the above goals can be obtained.

The following describes the measurement results shown in FIG. 8.

1) Making the Lamp More Compact

The line "21" in FIG. 8 is a line plotting the maximum electrode distance for each tube inner diameter within a range where the electrodes can be placed in the arc tube 202 in the globe 206 corresponding to the size of a 100 W incandescent lamp.

The electrode distance "Le" is obtained by calculations or the like as in the first embodiment. To be more specific, the electrode distance "Le" is obtained using the maximum length of the arc tube 202 that can be placed in the globe 206 (with the outer diameter of 60 mm and the length of 80 mm) corresponding to the size of the 100 W incandescent lamp. It should be noted here that values on the line "21" are maximum values for the electrode distance "Le".

2) Lamp Life

The line "22" in FIG. 8 is a line plotting the electrode distance "Le" for each tube inner diameter of the lamp that can achieve the lamp life of 6000 hours or more. To ensure the lamp life of 6000 hours or more, the tube wall load "we" of the arc tube 202 is to be set at 0.16 W/cm$^2$ or less as in the first embodiment. Using this tube wall load "we", the electrode distance "Le" is calculated.

3) Luminous Efficiency

The line "23" in FIG. 8 is a line plotting the electrode distance "Le" for each tube inner diameter of the lamp that can achieve the luminous efficiency of 70 lm/W. Values for the electrode distance "Le" on this line have been obtained by experiments, and are such values that can achieve the luminous efficiency of 70 lm/W as in the first embodiment.

Third Embodiment

In the present embodiment, the present invention is applied to a high-luminous-flux type 23 W lamp that is an alternative to a 100 W incandescent lamp having the luminous flux of 1700 lm level, whereas in the second embodiment the present invention is applied to a 21 W lamp that is an alternative to a 100 W incandescent lamp having the luminous flux of 1500 lm level.

In the present embodiment, a conventional 22 W lamp that has been an alternative to the 100 W incandescent lamp is referred to as a "conventional lamp". To differentiate a lamp according to the present embodiment from the lamps 1 and 201 according to the above embodiments, components of the lamp according to the present embodiment are given reference numerals 3--. As one example, the lamp according to the present embodiment is given reference numeral 301, but these reference numerals are not indicated in the figures.

The 100 W incandescent lamp having the luminous flux of 1700 lm level to which the lamp 301 according to the present embodiment aims to be an alternative has the same lamp structure and dimensions as the 100 W incandescent lamp having the luminous flux of 1500 lm level. To be more specific, the 100 W incandescent lamp having the luminous flux of 1700 lm level has the lamp diameter "φ" of 60 mm and the lamp length "L" of 110 mm.

1. Construction

The lamp 301 according to the present embodiment has the same basic construction as the lamp 201 according to the second embodiment, with the only difference being in the following point. As being an alternative to the 100 W incandescent lamp having the luminous flux of 1700 lm level, the input power for the lamp 301 is 23 W, which is higher than the input power 21 W for the lamp 201. Also, the electrode distance in an arc tube 302 of the lamp 301 is set longer than that in the lamp 201. It should be noted here that the tube inner diameter "φi" of a glass tube 309, too, is set in a range of 5.0 to 9.0 mm inclusive, for the same reasons as stated in the above embodiments.

Here, the following describes the specific construction and dimensions employed in the present embodiment.

The arc tube 302 is formed by the glass tube 309 having the tube inner diameter "φi" of 7.4 mm and the tube outer diameter "φo" of 9.0 mm, and the electrode distance "Le" is set at 680 mm. The glass tube 309 is formed to have a spiral structure including about 8 winds. The arc tube 309 has the outer diameter "φh" of 36 mm and the length "Lh" of 95 mm. The globe 306 has the outer diameter "φ" of 60 mm and the length "Lb" of 90 mm (see FIGS. 1 and 2).

As for the overall dimensions of the lamp 301, the lamp diameter "φ" is 60 mm and the lamp length "L" is 138 mm. As compared with the conventional lamp (with the lamp diameter "φ" of 65 mm, the lamp length "L" of 140 mm, and the luminous flux of 1520 lm), the lamp 301 has the luminous flux improved by 200 lm, despite having substantially the same length "L". The lamp 301 has the lamp diameter "φ" being 5 mm smaller than the conventional lamp.

The following describes performances of the lamp 301 with the above-descried construction.

The lamp 301 was lit with the base being oriented upward by applying the input power of 23 W. According to the measurement results for the lamp 301, the luminous flux rising characteristics at the lamp startup were equivalent to those of a conventional fluorescent lamp for general lighting. Also, the luminous flux was 1720 lm, and the luminous efficiency was 74.8 lm/W, which is higher than the target luminous efficiency. Further, the lamp life of 6000 hours or more was confirmed.

2. Examination Matters

In the present embodiment, the dimensions of the lamp 301 are set in the following way, for the purpose of achieving the goal of making the lamp 301 more compact than the conventional lamp. In particular, the lamp diameter "φ" is set in a range of 60 to 65 mm, which is smaller than the lamp diameter "φ" of 65 mm of the conventional lamp.

In the same manner as that for the 21 W lamp 201 having the luminous flux of 1500 lm level in the second embodiment, the goals are set for the lamp 301 to achieve the target luminous efficiency of 70 lm/W or more and the lamp life of 6000 hours or more.

Figure 9:
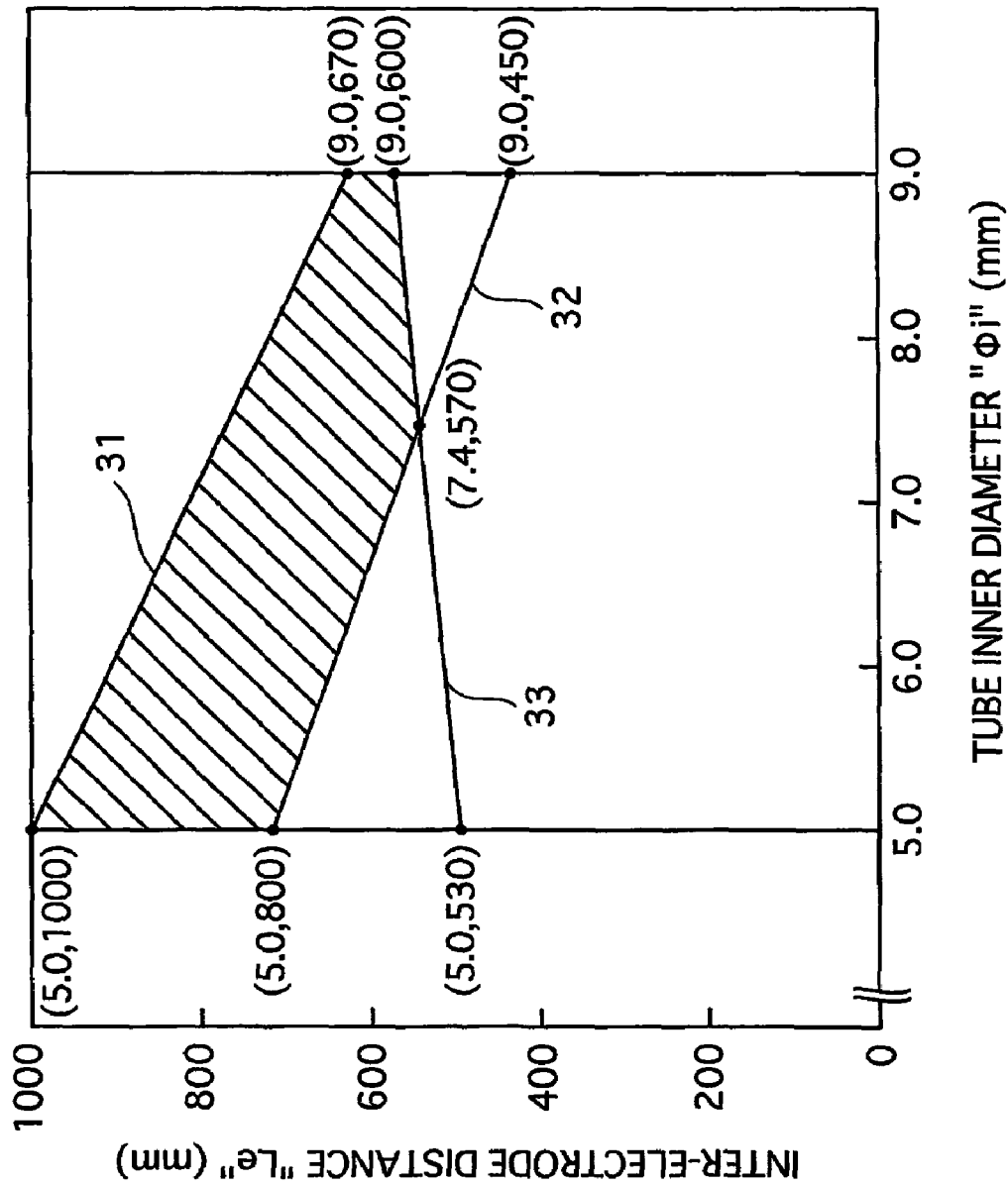
FIG. 9 shows the relationship between the tube inner diameter of the glass tube and the electrode distance of the arc tube used in a high-luminous-flux type 23 W lamp that is an alternative to a 100 W incandescent lamp.

As in the second embodiment, the inventors prepared a number of lamps 301 each varying in the tube inner diameter "φi" of the glass tube 309 and the electrode distance "Le" in the arc tube 302, and carried out measurements of these lamps, to find out values that can satisfy the above goals of making the lamp more compact, improving the luminous efficiency, and ensuring the lamp life. The measurement results are shown in FIG. 9. When the relationship between the tube inner diameter "φi" of the glass tube 309 and the electrode distance "Le" is within a range indicated by a shaded area in FIG. 9, the lamp 301 that can satisfy the above goals can be obtained.

The following describes the measurement results shown in FIG. 9.

1) Making the Lamp More Compact

The line "31" in FIG. 9 is a line plotting the maximum electrode distance for each tube inner diameter "φi" within a range where the lamp diameter "φ" of the lamp 301 at most is substantially equivalent to that of the 100 W incandescent lamp and the length "L" of the lamp 301 is substantially equivalent to that of the conventional 22 W lamp. To be more specific, the electrode distance "Le" for each tube diameter "φi" is obtained using the maximum length of the arc tube 302 that can be placed in the globe 306 with the outer diameter "φ" of about 60 mm and the length "Lb" of about 90 mm.

2) Lamp Life

The line "32" in FIG. 9 is a line plotting the electrode distance "Le" for each tube inner diameter of the lamp that can achieve the lamp life of 6000 hours or more. As in the first and second embodiments, values for the electrode distance "Le" are calculated at such values that correspond to the tube wall load "we" of the arc tube 302 being 0.16 W/cm$^2$.

3) Luminous Efficiency

The line "33" in FIG. 9 is a line plotting the electrode distance "Le" for each tube inner diameter of the lamp that can achieve the luminous efficiency of 70 lm/W. Values for the electrode distance "Le" on this line have been obtained by experiments.

Fourth Embodiment

In the present embodiment, the present invention is applied to a 7 W lamp that is an alternative to a 40 W incandescent lamp having the luminous flux of 500 lm level, whereas in first embodiment the present invention is applied to a 11 W lamp that is an alternative to a 60 W incandescent lamp, in the second embodiment the present invention is applied to a 21 W lamp that is an alternative to a 100 W incandescent lamp, and in the third embodiment the present invention is applied to a 23 W lamp that is an alternative to a 100 W incandescent lamp.

In the present embodiment, a conventional 8 W lamp that has been an alternative to the 40 W incandescent lamp is referred to as a "conventional lamp". To differentiate a lamp according to the present embodiment from the lamps 1, 201, and 301 according to the above embodiments, components of the lamp according to the present embodiment are given reference numerals 4--. As one example, the lamp according to the present embodiment is given reference numeral 401, but these reference numerals are not shown in the figures.

A 40 W incandescent lamp to which the lamp 401 according to the present embodiment aims to be an alternative has the lamp diameter "φ" of 55 mm, the lamp length "L" of 98 mm, and the luminous flux of 485 lm. It should be noted here that this 40 W incandescent lamp, together with the 60 W and 100 W incandescent lamps described above, is widely used as a major product in the market. Also, a conventional 8 W lamp that has been an alternative to a 40 W incandescent lamp has the lamp diameter "φ" of about 60 mm and the lamp length "L2" of about 122 mm. As for the performances of this conventional 8 W lamp, the luminous flux is 500 lm and the luminous efficiency is 62.5 lm/W.

1. Construction

The lamp 401 according to the present embodiment has the same basic construction as the lamps according to the first to third embodiments, with the only difference being in the following point. As being an alternative to the 40 W incandescent lamp having the luminous flux of 500 lm level, the input power for the lamp 401 is 7 W, which is smaller than that for the lamps according to the first to third embodiments. Also, the electrode distance "Le" in an arc tube 402 of the lamp 401 is set shorter than that in the lamps according to the first to third embodiments. It should be noted here that the tube inner diameter "φi" of a glass tube 409, too, is set in a range of 5.0 to 9.0 mm inclusive, for the same reasons as stated in the first embodiment.

Here, the following describes the specific construction and dimensions employed in the present embodiment.

The arc tube 402 is formed by the glass tube 409 having the tube inner diameter "φi" of 7.4 mm and the tube outer diameter "φo" of 9.0 mm, and the electrode distance "Le" is set at 250 mm. The glass tube 409 is formed to have a spiral structure including about 3.5 winds. The arc tube 402 has the outer diameter "φh" of 36 mm and the length "Lh" of 52 mm. The globe 406 has the outer diameter "φ" of 55 mm and the length "Lb" of 46 mm (see FIGS. 1 and 2).

As for the overall dimensions of the lamp 401, the lamp diameter "φ" is 55 mm and the lamp length "L" is 98 mm. The lamp 401 is much more compact than the conventional lamp (with the lamp diameter "φ" of 60 mm and the lamp length "L" of 122 mm), and further, is as compact as the 40 W incandescent lamp (with the lamp diameter "φ" of 55 mm and the lamp length "L" of 98 mm).

Further, the following describes performances of the lamp 401 with the above-descried construction.

The lamp 401 was lit with the base being oriented upward by applying the input power of 7 W. According to the measurement results for the lamp 401, the luminous flux rising characteristics at the lamp startup were equivalent to those of a conventional fluorescent lamp for general lighting. Also, the luminous flux was 510 lm, and the luminous efficiency was 72.9 lm/W, achieving the target luminous efficiency. Further, the lamp life of 6000 hours or more was confirmed.

2. Examination Matters

In the present embodiment, the dimensions of the lamp 401 are set to achieve the goal of making the lamp 401 substantially as compact as the 40 W incandescent lamp. In the same manner as that for the lamps 1, 201, and 301 according to the first to third embodiments, the goals are set for the lamp 401 to achieve the target luminous efficiency of at 70 lm/W and the target lamp life of at 6000 hours or more.

Figure 10:
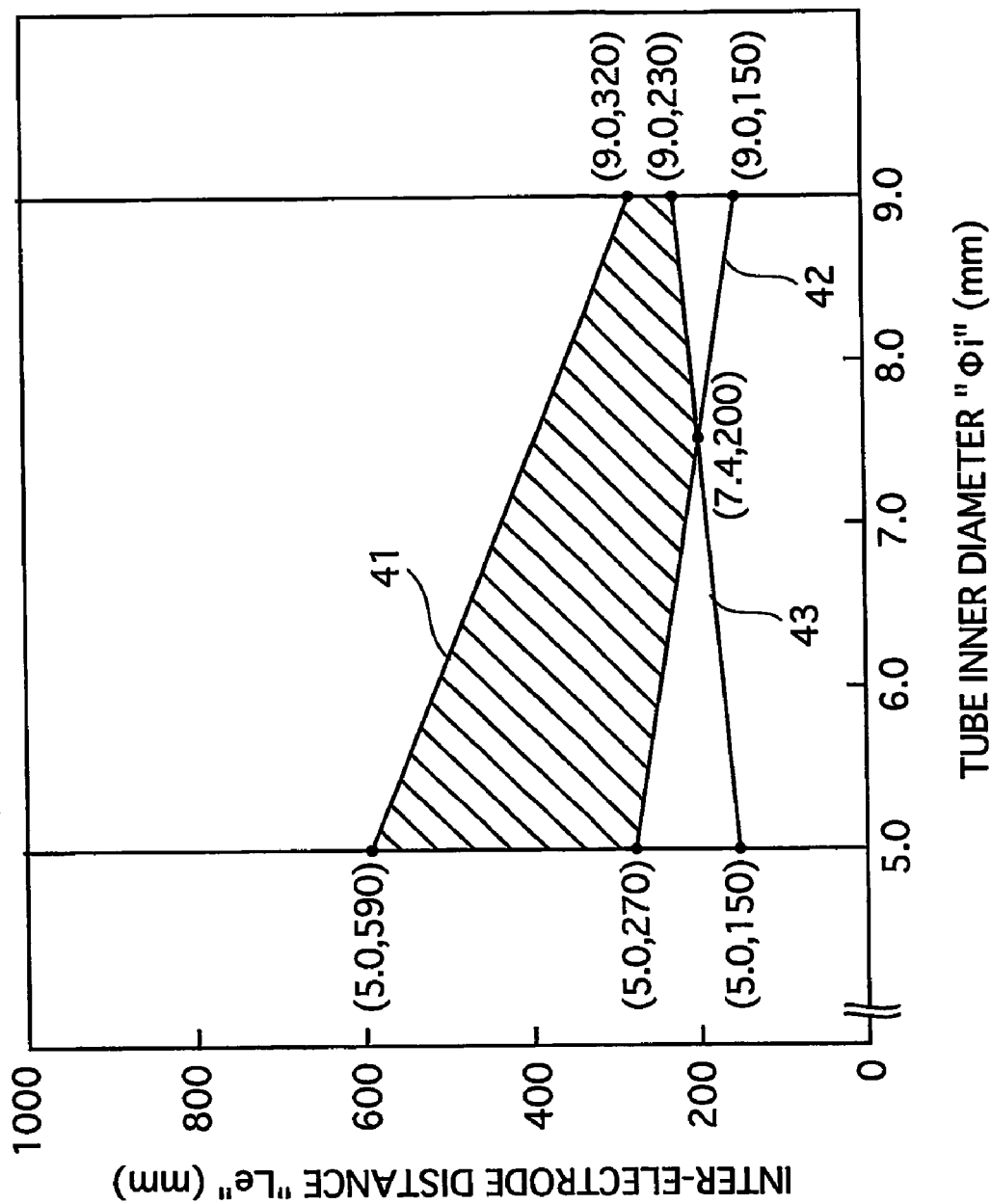
FIG. 10 shows the relationship between the tube inner diameter of the glass tube and the electrode distance of the arc tube as an alternative to a 40 W incandescent lamp.

As in the first to third embodiments, the inventors prepared a number of lamps 401 each varying in the tube inner diameter "φ" of the glass tube 409 and the electrode distance "Le" in the arc tube 402, and carried out measurements of these lamps, to find out values that can satisfy the above goals of making the lamp more compact, improving the luminous efficiency, and ensuring the lamp life. The measurement results are shown in FIG. 10. When the relationship between the tube inner diameter "φi" of the glass tube 409 and the electrode distance "Le" is within a range indicated by a shaded area in FIG. 10, the lamp 401 that can satisfy the above goals can be obtained.

The following describes the measurement results shown in FIG. 10.

1) Making the Lamp More Compact

The line "41" in FIG. 10 is a line plotting the maximum electrode distance "Le" for each tube inner diameter "φi" within a range where the lamp 401 have dimensions substantially equivalent to the 40 W incandescent lamp. To be more specific, the electrode distance "Le" for each tube diameter "φi" is obtained using the maximum length of the arc tube 402 that can be placed in the globe 406 with the outer diameter "φ" of about 55 mm and the length "Lb" of about 46 mm.

2) Lamp Life

The line "42" in FIG. 10 is a line plotting the electrode distance "Le" for each tube inner diameter of the lamp that can achieve the lamp life of 6000 hours or more. As in the first to third embodiments, values for the electrode distance "Le" are calculated at such values that correspond to the tube wall load "we" of the arc tube 402 being 0.16 W/cm$^2$.

3) Luminous Efficiency

The line "43" in FIG. 10 is a line plotting the electrode distance "Le" for each tube inner diameter of the lamp that can achieve the luminous efficiency of 70 lm/W. Values for the electrode distance "Le" on this line have been obtained by experiments.

Fifth Embodiment

In the present embodiment, the present invention is applied to a triple U-shape arc tube that is made up of three U-shape glass tubes and a quad U-shape arc tube that is made up of four U-shape glass tubes, whereas in the first to fourth embodiments the present invention is applied to the arc tubes 2, 202, 302, and 402 each being formed by a double-spiral glass tube. To differentiate a lamp according to the present embodiment from the lamps 1, 201, 301, and 401 according to the above embodiments, components of the lamp according to the present embodiment are given reference numerals 5--. As one example, the lamp according to the present embodiment is given reference numeral 501.

The following describes the basic construction of the lamp 501 including a triple U-shape arc tube or a quad U-shape arc tube. In the same manner as that for the lamps 1, 201, 301, and 401 each including the double-spiral arc tube, mercury is enclosed within the arc tube 502 in the substantially single form. The tube inner diameter "φi" of the glass tube 509 is set in a range of 5.0 to 9.0 mm. Then, the coolest point 516 of at least one of three U-shape glass tubes 509 constituting the triple U-shape or at least one of four U-shape glass tubes 509 constituting the quad U-shape arc tube and a part of the globe 506 corresponding to the coolest point 516 is thermally connected via a heat-conductive member such as a silicone resin 515. Then, the coolest point formed integrally as a part of the connected U-shape glass tube is cooled down. By doing so, the luminous flux rising characteristics at the lamp startup are basically improved to a level equivalent to a fluorescent lamp for general lighting. Further, the luminous efficiency equivalent to that for the lamps 1 and 201 including the double-spiral arc tubes 2 and 202 can be obtained.

Figure 11A:
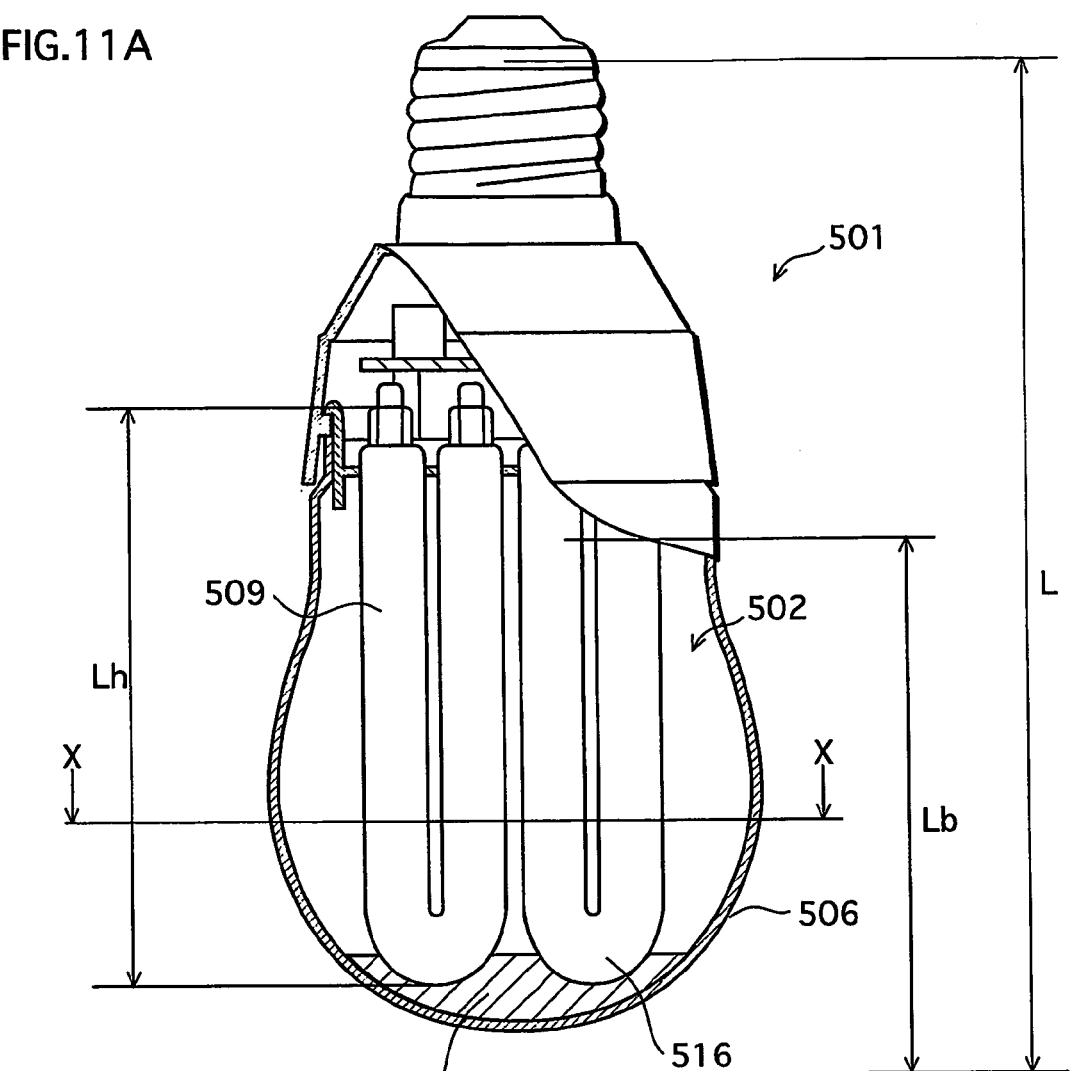
FIG. 11A is a front view showing the overall construction of a compact self-ballasted fluorescent lamp according to a fifth embodiment of the present invention, partially cut away to shows its inside.
Figure 11B:
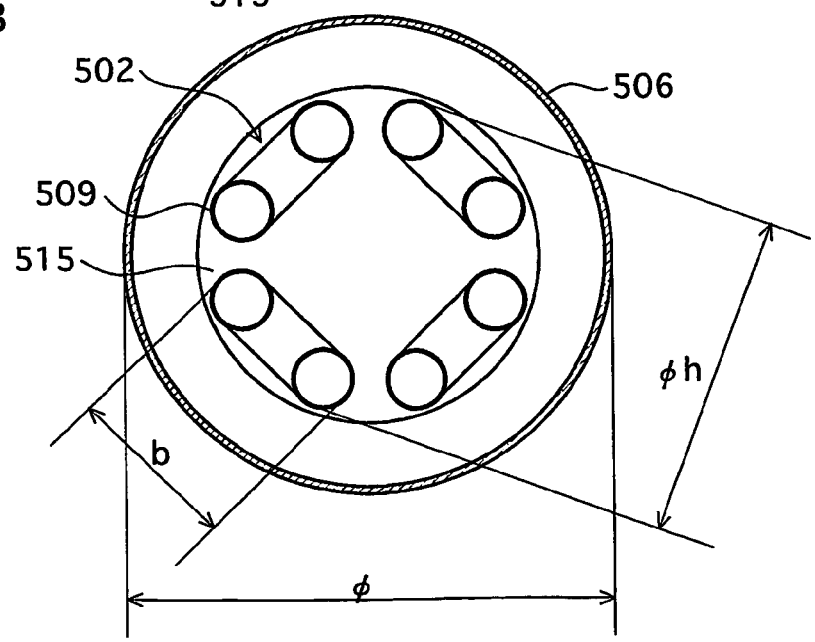
FIG. 11B is a plan view showing a cross section of the compact self-ballasted lamp taken along X-X line in FIG. 11A.

FIG. 11A shows the overall construction of the lamp 501 according to the fifth embodiment, partially cut away to its inside. The lamp 501 includes the arc tube 502 for use in a 11 W lamp that is an alternative to a 60 W incandescent lamp. As one example, the arc tube 502 is a quad U-shape arc tube that is made up of four U-shape glass tubes. FIG. 11B is a plan view showing a cross section of the lamp 501 taken along X-X line in FIG. 11A. It should be noted here that the X-X line in FIG. 11A corresponds to the largest outer diameter of the globe 506.

The lamp 501 according to the present embodiment is characterized by including the arc tube 502 in which three or four U-shape glass tubes 509 are bridge-connected to form a single discharge path therein. In FIG. 11A, a U-bent part of each glass tube 509 in which the coolest point is formed is thermally connected to a bottom end part of the globe 506 corresponding to the U-bent part via a heat-conductive member such as the silicone resin 515. Except this point, the lamp 501 has the similar construction to the lamp 1 including the double-spiral arc tube 2.

Here, the tube inner diameter "φi" of the glass tube 509 and the electrode distance "Le" of the arc tube 501 are particularly set in the range indicated by the shaded area shown in FIG. 6. Due to this, as in the case of using the double-spiral arc tube 2, the lamp having the luminous efficiency of 70 lm/W and the lamp life of 6000 hours can be obtained.

The following describes the specific construction and dimensions employed in the present embodiment.

The arc tube 502 is formed by four U-shape glass tubes 509 each having the tube inner diameter "φi" of 7.4 mm and the tube outer diameter "φo" of 9.0 mm. The electrode distance "Le" is set at 340 mm. The tube width "b" of each U-shape glass tube 509 is 20 mm (see FIG. 11B).

Also, the arc tube 502 has the maximum outer diameter "φh" of 46 mm and the length "Lh" of 60 mm. The globe 506 has the outer diameter "φ" of 60 mm and the length "Lb" of 58 mm. The completed lamp 501 has the lamp diameter "φ" of 60 mm and the lamp length "L" of 110 mm, as being substantially equivalent to the 60 W incandescent lamp.

It should be noted here that the arc tube may be made up of three U-shape glass tubes 509 instead of the four U-shape glass tubes 509. In this case, however, the length "Lh" of the arc tube is 73 mm, which is longer than the length "Lh" being 60 mm of the arc tube 502 including the four U-shape glass tubes 509, and so the length "L" of the arc tube is inevitably as long as 123 mm, which is longer than the length "L" 110 mm of the arc tube 502 including the four U-shape glass tubes 509.

The lamp 501 was lit with the base being oriented upward by applying the input power of 11 W. According to the measurement results for the lamp 501, the luminous flux rising characteristics at the lamp startup were substantially equivalent to those of a conventional fluorescent lamp for general lighting. Also, the luminous flux was 780 lm, and the luminous efficiency was 70.9 lm/W. Further, the lamp life of 6000 hours or more was confirmed.

For the 21 W lamp 501a having the luminous flux of 1500 lm level that is an alternative to the 100 W incandescent lamp (to differentiate this 21 W lamp from the 21 W lamp 501 that is an alternative to the 60 W incandescent lamp, a reference numeral 501a is given to this 21 W lamp), too, an arc tube 502a having the same basic construction as the arc tube 502 shown in FIGS. 11A and 11B, i.e., a quad U-shape arc tube is prepared. By setting the tube inner diameter "φi" of the glass tube 509a and the electrode distance "Le" of the arc tube 502a in the range indicated by the shaded area shown in FIG. 8, the lamp 501a with improved luminous flux rising characteristics that are equivalent to those for the lamp using the double-spiral arc tube, and with the luminous efficiency of 70 lm/W or more can be obtained.

However, the overall dimensions of the lamp 501a using the quad U-shape arc tube 502a are inevitably larger than that of the lamp using the double-spiral arc tube 202. For example, when the tube inner diameter "φi" of the glass tube 509a is set at 7.4 mm, the tube outer diameter "φo" of the glass tube 509a at 9.0 mm, and the electrode distance "Le" in the arc tube 502a at 640 mm, the arc tube 502a has the outer diameter "φh" of 46 mm and the length "Lh" of 95 mm, and the globe 506a has the outer diameter "φ" of 65 mm and the length "Lb" of 90 mm.

Further, the finished lamp 501a has the lamp diameter "φ" of as large as 65 mm and the lamp length "L" of as long as 140 mm. Here, as one method for shortening the increased lamp length "L" of the lamp 506a to 128 mm that is the lamp length "L" of the lamp 201 including the double-spiral arc tube 102, an arc tube that is made up of five U-shape glass tubes may be used.

Sixth Embodiment

Although in the above embodiments the target luminous efficiency is 70 lm/W or more, the inventors have examined techniques for further improving the luminous efficiency without changing the size of a lamp. To differentiate a lamp according to the present embodiment from the lamp 1 according to the first embodiment, components of the lamp according to the present embodiment are given reference numerals 6--. As one example, the lamp according to the present embodiment is given reference numeral 601.

Figure 12:
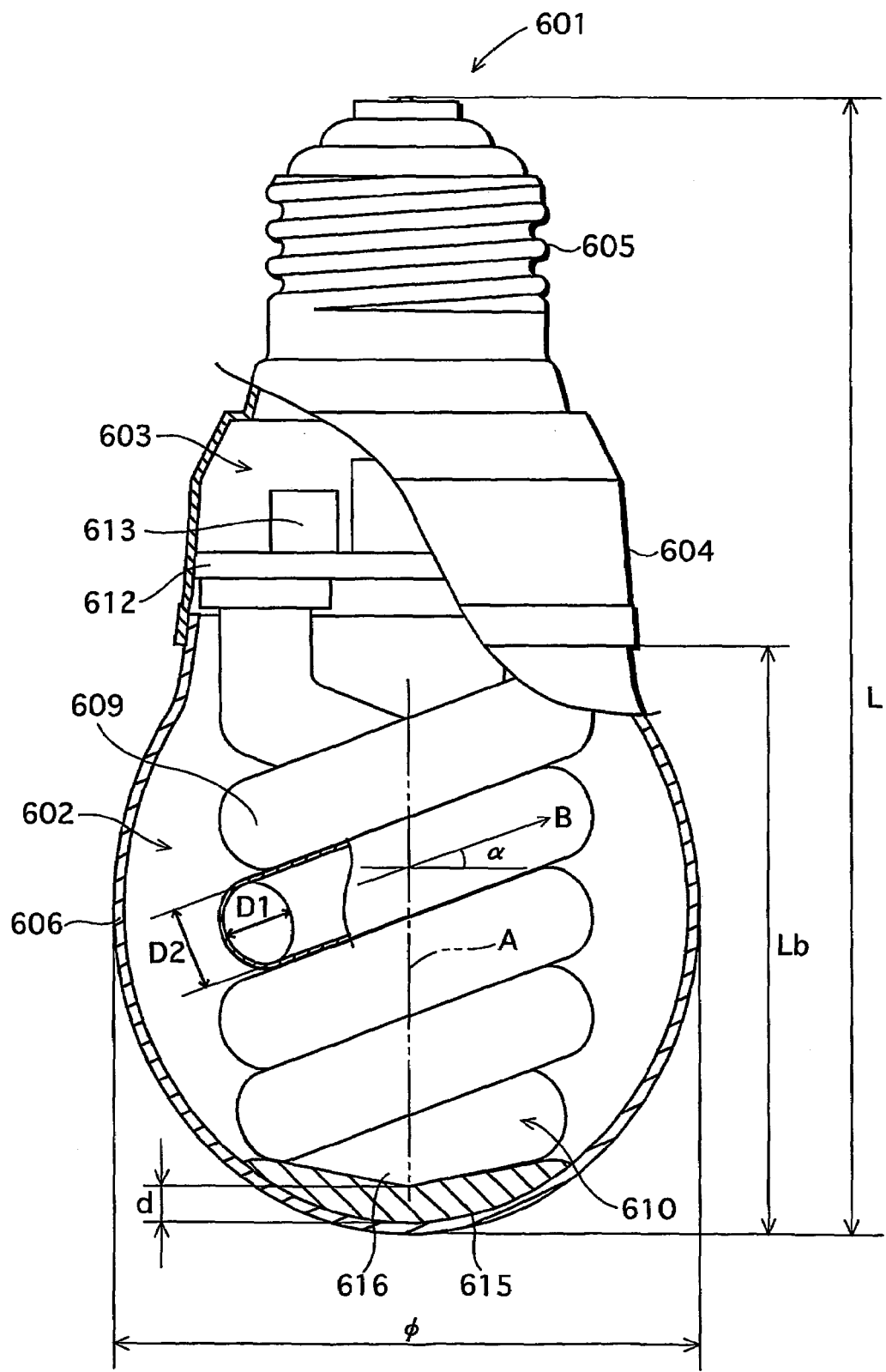
FIG. 12 is a front view showing the overall construction of a compact self-ballasted fluorescent lamp according to a sixth embodiment of the present invention, partially cut away to shows its inside.

FIG. 12 shows the overall construction of a 11 W lamp according to the six embodiment, as an alternative to a 60 W incandescent lamp. The lamp 601 according to the present embodiment has the same basic construction as the lamp 1 according to the first embodiment, with the only difference being in the following point. In the present embodiment, a glass tube 609 forming an arc tube 602 has an oval-shaped cross section, whereas in the first embodiment the glass tube 9 has a circular-shaped cross section.

1. Lamp Construction and Characteristics a) Electrode Distance being 340 mm

The following describes the specific construction and dimensions employed in the present embodiment. The glass tube 609 forming the arc tube 602 has the following oval-shaped cross section. Its inner circumference has the minor tube inner diameter (the minor axis of the oval) "D1" of 5.4 mm and the major tube inner diameter (the major axis of the oval) "D2" of 7.4 mm. Its outer circumference has the minor tube outer diameter of 7.0 mm and the major tube outer diameter of 9.0 mm. Also, the electrode distance "Le" in the arc tube 602 is set at "340+β mm".

A value for "β" varies depending on the position of the glass tube 609 that is wound around the axis "A". In other words, a value for "β" varies depending on the distance between the tube center of the glass tube 609 and the axis "A". To be more specific, assume that the position of the outermost circumference of the glass tube 609 having an oval-shaped cross section is the same as the position of the outermost circumference of the glass tube 9 having a circular-shaped cross section. In this case, a value of "β" for the glass tube 609 is the largest (about 30 mm). On the other hand, assume that the position of the innermost circumference of the glass tube 609 having an oval-shaped cross section is the same as the position of the innermost circumference of the glass tube 9 having a circular-shaped cross section. In this case, a value of "β" for the glass tube 609 is the smallest (substantially 0 mm).

It should be noted here that the major tube inner diameter "D2" is 7.4 mm, which is equal to the tube inner diameter "φi" in the first and second embodiments. Also, the arc tube 602 has a spiral structure including about five winds as in the first embodiment. The arc tube 602 has the outer diameter "φh" of 36 mm and the length "Lh" of 64 mm. The globe 606 has the outer diameter "φ" of 55 mm and the length "Lb" of 58 mm and can cover the above arc tube 602.

The lamp 601 has the lamp diameter "φ" of 55 mm and the lamp length "L" of 110 mm, the lamp diameter being little smaller than the lamp length of the 60 W incandescent lamp (with the lamp diameter "φ" of 60 mm and the lamp length "L" of 110 mm).

On the other hand, the coolest point 616 formed at the bottom end part of the arc tube 602 and the bottom end part of the globe 606 at its inner circumference are connected via a transparent silicone resin 615. It should be noted here that the distance "d" between the bottom end part of the arc tube 602 and the bottom end part of the globe 606 at its inner circumference is 2 mm. The bottom end part of the arc tube 602 is partially embedded by about 2 mm in the silicone resin 615.

The following describes performances of the lamp 601 with the above-described construction.

The lamp 601 was lit with the base being oriented upward by applying the input power of 11 W. According to the measurement results for the lamp 601, the luminous flux rising characteristics at the lamp startup were equivalent to those of a conventional fluorescent lamp for general lighting. Also, at the lamp current of about 70 mA, the luminous flux was 820 lm, and the luminous efficiency was 74.6 lm/W, which is greatly higher the target luminous efficiency of 70 lm/W.

This luminous efficiency shows an improvement of about 4% with respect to the luminous efficiency of the lamp 1 according to the first embodiment. In this way, by using the arc tube 602 having an oval-shaped cross section, the luminous efficiency can be improved even if the arc tube 602 has the same length as the arc tube 2 according to the first embodiment.

This can be explained as follows. For the arc tubes 602 and 2 having the same arc tube input and the surface area of the inner circumference per unit length, the arc tube 602 having an oval-shaped cross section has a shorter optical path than the arc tube 2 having a circular-shaped cross section. Therefore, the maximum luminous flux temperature for the arc tube 602 having an oval-shaped cross section can be made higher than that for the arc tube 2 having a circular-shaped cross section. Due to this, degradation of the luminous efficiency caused by an increase in a mercury vapor pressure in the arc tube 602 when the arc tube 602 is placed in the globe 606 can be suppressed, and so the luminous efficiency can be improved further. To sum up, it is basically advantageous that the globe-type lamp 601 uses the arc tube 602 having an oval-shaped cross section, in view of improving the luminous efficiency.

b) Electrode Distance being 365 mm

The following describes the specific construction and dimensions employed in the present embodiment. The glass tube 609 forming the arc tube 602 is in the following oval-shaped cross section. Its inner circumference has the minor tube inner diameter "D1" of 5.4 mm and the major tube inner diameter "D2" of 7.4 mm. Its outer circumference has the minor tube outer diameter of 7.0 mm and the major tube outer diameter of 9.0 mm. Also, the electrode distance "Le" in the arc tube 602 is set at about 365 mm. The arc tube 602 has a spiral structure including about five winds in the first embodiment. The arc tube 602 has the outer diameter "φh" of 36 mm and the length "Lh" of 64 mm.

The lamp 601 has the lamp diameter "φ" of 55 mm and the lamp length "L" of 100 mm, and is more compact than the 60 W incandescent lamp (with the lamp diameter "φ" of 60 mm and the lamp length "L" of 110 mm).

The following describes performances of the lamp 601 with the above-described construction.

The lamp 601 was lit with the base being oriented upward by applying the input power of 11 W. According to the measurement results for the lamp 601, the luminous flux rising characteristics at the lamp startup were equivalent to those of a conventional fluorescent lamp for general lighting. Also, at the lamp current of about 65 mA, the luminous flux was 810 lm, and the luminous efficiency was 74.6 lm/W.

On the other hand, the lamp 1 according to the first embodiment includes the arc tube 2 formed by the glass tube 9 with a circular-shaped cross section having the inner diameter of 7.4 mm and the outer diameter of 9.0 mm and the electrode distance is set at 340 mm. The lamp 1 according to the first embodiment was lit with the base being oriented upward at the lamp current of 75 mA. According to the measurement results, the luminous flux was 790 lm and the luminous efficiency was 71.9 lm/W.

In this way, by using the glass tube 609 having an oval-shaped cross section, the input current can be reduced by about 10 mA, the luminous flux can be increased by 20 lm, and the luminous efficiency can be increased by 2.7 lm/W, as compared with the case of the first embodiment where a glass tube (9) having a circular-shaped cross section with the tube inner diameter being equal to the major tube inner diameter of the above oval-shaped cross section is used.

2. Manufacturing Method for the Arc Tube

The following describes a manufacturing method for the arc tube 602 formed by the glass tube 609 having an oval-shaped cross section. The arc tube 602 having the oval-shaped cross section according to the present embodiment is manufactured using a glass tube 630 (not shown) that is straight and has a circular-shaped cross section as the glass tube 9 used for the arc tube 2 in above embodiments. The arc tube 602 is also manufactured by the process of softening the middle part of the glass tube 630 using a heating furnace, and spirally winding the softened glass tube 630 around a mandrel 620.

Figure 13:
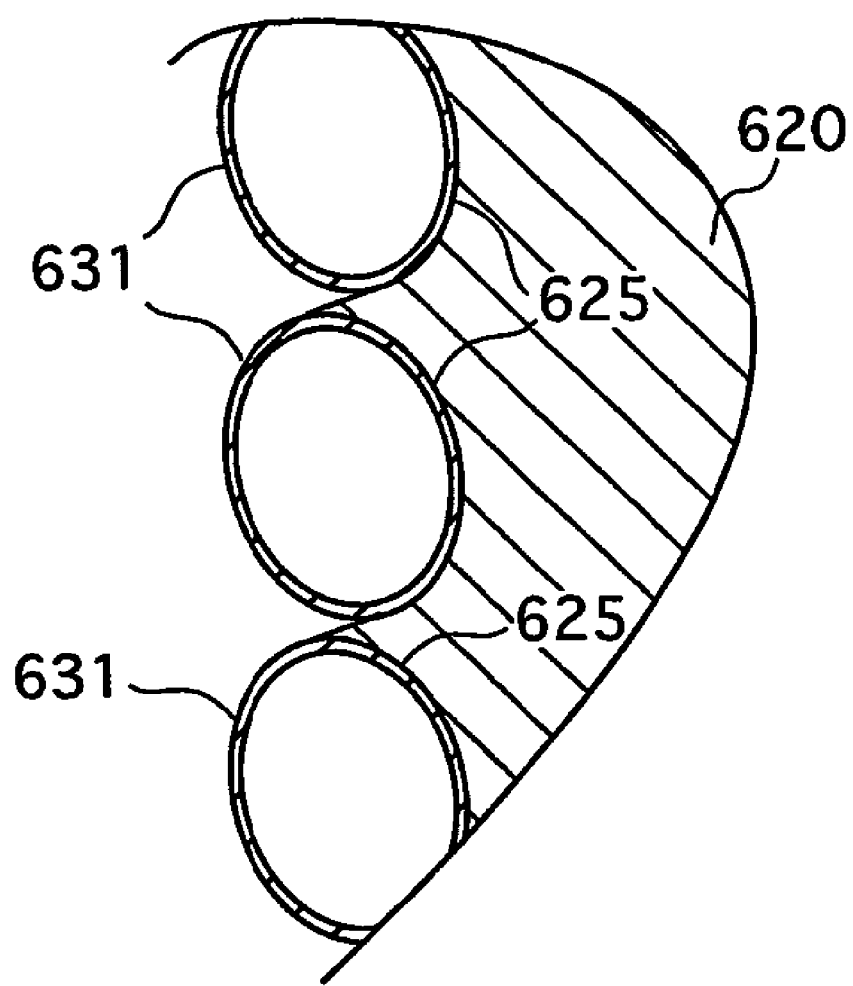
FIG. 13 is a longitudinal sectional view showing the state where a glass tube is wound around a mandrel to shape an arc tube according to the sixth embodiment.

The manufacturing method for the arc tube 602 formed by the glass tube 609 having an oval-shaped cross section in the present embodiment differs from the manufacturing method for the arc tube 2 formed by the glass tube 9 having a circular-shaped cross section described in the first embodiment in the following point. For the arc tube 602 in the present embodiment, the pressure of a gas, such as nitrogen, to be blown into the glass tube 631 in the forming process is adjusted to be reduced, in such a manner that the cross section of the glass tube 631 is made into an oval-shape. Also, as shown in FIG. 13, the groove 625 of the mandrel 620 has an oval arc-shaped cross section. It should further be noted here that a shape that matches the cross section of the groove 625 is an oval-shape having the major axis in the direction substantially parallel to the axis direction of the mandrel 620, e.g., the direction inclined to the axis direction at the spiral angle.

Therefore, the glass tube 631 being softened as described above is pressed against the mandrel 620 by a gas blown into the glass tube 631 during the forming process, so that the arc tube 602 having an oval-shaped cross section can be easily obtained. Here, both ends of the shaped glass tube 631 retain circular-shaped cross sections of the unshaped glass tube. Even if the minor tube inner diameter "D1" is 5.0 mm or less, therefore, the major tube inner diameter "D2" at both the ends is 5.0 mm or more. Therefore, the electrodes can be placed.

3. Examination Matters

To further widespread compact self-ballasted fluorescent lamps as energy-saving light sources that are alternatives to incandescent lamps, the inventors examined various methods for further improving the luminous efficiency regardless of whether a lamp is a globe-type lamp or a non globe-type lamp, or whether mercury is enclosed within an arc tube in the form of an amalgam or in the single form.

1) Oval-Shape

The inventors first examined the method of reducing the inner diameter of the glass tube 9, for the purpose of increasing the maximum luminous-flux temperature. In the first embodiment, the electrodes 7 and 8 cannot be placed in the glass tube 9 if the tube inner diameter "φi" is set smaller than 5 mm. However, by making the cross section of the glass tube in an oval-shape, specifically, the oval-shape having the major tube inner diameter "D2" being 5 mm or more, the electrodes can be placed by utilizing the major tube inner diameter "D2" even if the minor inner diameter "D1" is 5 mm or less.

Further, if the inner circumference of the cross section of the glass tube 609 is in an oval-shape, in particular, the oval-shape having the minor tube inner diameter "D1" in the direction substantially the same as direction "B" that is inclined at the spiral angle "α" with respect to the horizontal direction (the direction perpendicular to the axis "A" of the glass tube) (see FIG. 14), the electrode distance (the shortest distance between the electrodes) can be longer, as compared with a glass tube having a circular-shaped cross section whose diameter is equal to the major tube inner diameter "D2" of this oval shape.

Figure 14:
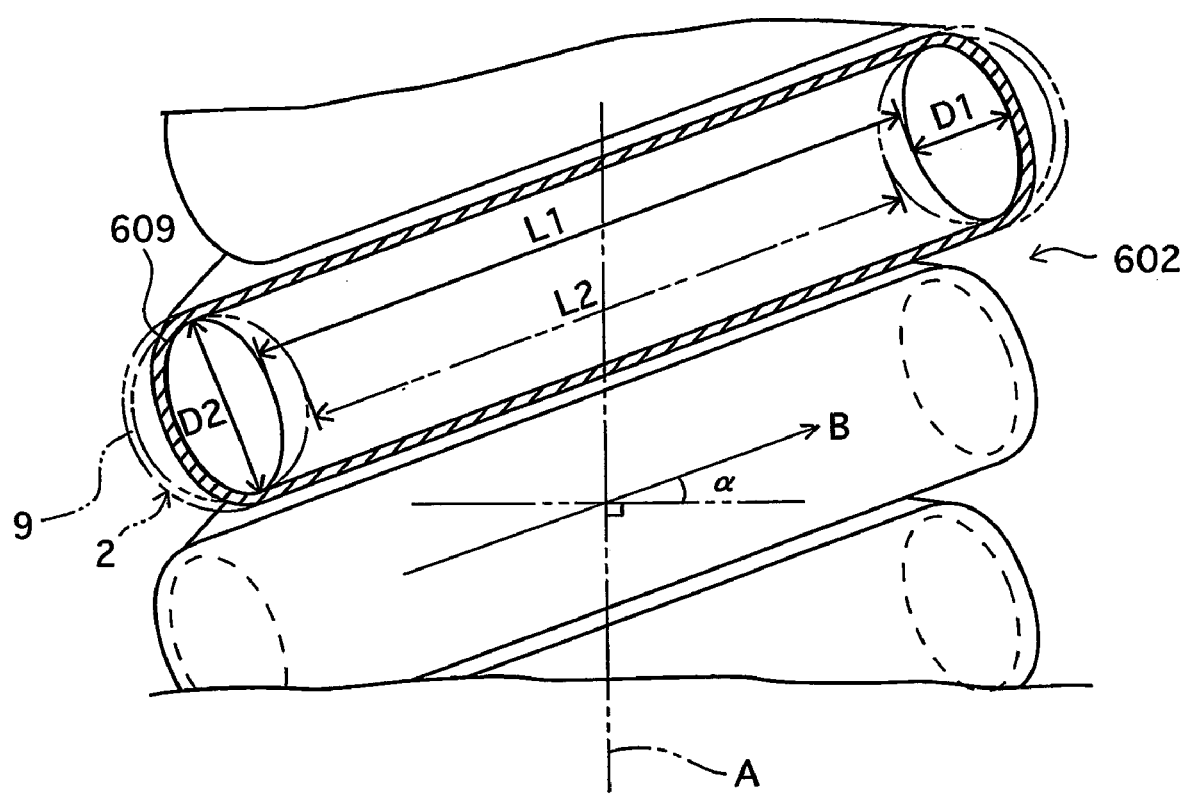
FIG. 14 is a drawing for explaining a difference in the electrode distance between when the glass tube has an oval-shaped cross section and when the glass tube has a circular-shaped cross section.

Here, the following describes why the electrode distance can be made longer when the cross section of the glass tube 609 is in an oval-shape, with reference to FIG. 14. FIG. 14 shows the glass tube 609 cut away along a plane including a predetermined position thereof and a position distant from the predetermined position by a half wind.

In the cross section of the glass tube 609, the oval-shape having the minor tube inner diameter "D1" in direction "B" is indicated by a solid line, and a circle having the tube inner diameter being equal to the major tube inner diameter "D2" of the oval-shape is indicated by a thin line (corresponding to the arc tube 2 in the first embodiment) It should be noted here that the figure indicates the case where the glass tubes 9 and 609 have cross sections sharing the same center.

The electrode distance in each of the arc tubes 2 and 602 is typically the shortest distance connecting a pair of electrodes provided therein. In the case where the glass tube 609 has an oval-shaped cross section, therefore, the shortest spiral path corresponds to an inner circumference of the glass tube 609 positioned closest to the axis "A", i.e., a circumference with the diameter being "L1". In the case where the glass tube 9 has a circular-shaped cross section, the shortest spiral path corresponds to an inner circumference of the glass tube 9 closest to the axis "A", i.e., a circumference with the diameter of being "L2".

As can be clearly seen from FIG. 14, when the arc tube having the circular-shaped cross section and the arc tube having the oval-shaped cross section whose major diameter is equal to the diameter of the circular-shaped cross section are compared, the arc tube 602 having the oval-shaped cross section has a longer electrode distance than the arc tube 2 having the circular-shaped cross section. Further, because the arc tubes 2 and 602 are formed by winding the glass tubes 9 and 609 around the axis "A" by a plurality of winds, a difference in the electrode distance between the arc tubes 2 and 602 would be remarkable for the total length of the arc tubes 2 and 602. Therefore, the luminous efficiency can be improved further.

Further, for the glass tube 609 having an oval-shaped cross section, the outer circumference is closer to the axis "A" than the outer circumference if the glass tube 9 having a circular-shaped cross section. Therefore, the outer circumference of the arc tube 602 can be made smaller than that of the arc tube 2.

As described above, by making the cross section of the glass tube 609 in an oval-shape having the minor tube inner diameter "D1" in direction "B", an optical path on which ultraviolet light emitted form mercury atoms travels to the tube wall can be shortened, as compared with the case of the arc tube formed by a glass tube 2 having a circular-shaped cross section with the diameter being equal to the major tube inner diameter of the oval shape. Further, the electrode distance can also be lengthened. Therefore, the luminous efficiency can be improved further.

Figure 15:
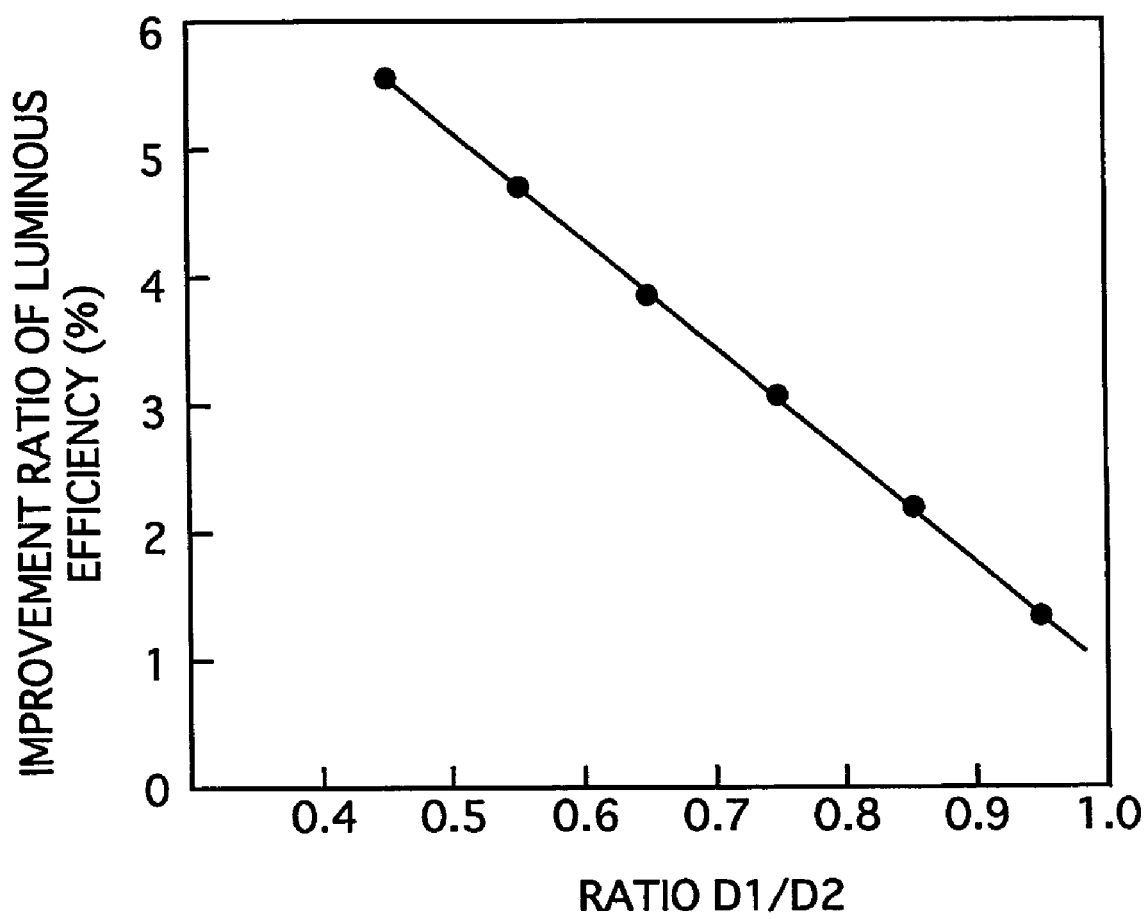
FIG. 15 shows the relationship between (a) a ratio of a minor tube inner diameter and a major tube inner diameter, and (b) an improvement ratio of luminous efficiency, for the glass tube having an oval-shaped cross section.

Then, the inventors prepared a number of lamps including arc tubes 602 formed by the glass tubes 609 having an oval-shaped cross section, each varying in a ratio of the minor tube inner diameter "D1" to the major tube inner diameter "D2" of the oval-shape, and measured the luminous efficiency of each of the prepared lamps. The measurement results are shown in FIG. 15 as the relationship between the ratio "D1/D2" and an improvement ratio of luminous efficiency. According to these experimental results, the improvement ratio of luminous efficiency increases as the ratio D1/D2 decreases.

Here, for the glass tubes 609 used for the above experiments, the electrode distance was uniformly set at 400 mm and the major tube inner diameter "D2" was also uniformly set at 8.0 mm. The minor tube inner diameter "D1" was variously set at 7.4 mm, 6.7 mm, 6.1 mm, 5.3 mm, 4.5 mm, and 3.6 mm. Each lamp was lit with the base being oriented upward at the lamp current of 90 mA.

In particular, when the glass tube 609 has the oval-shaped cross section with the minor tube inner diameter "D1" in direction "B" and the ratio "D1/D2" is 0.85 or less, the luminous efficiency is improved by 2% or more as compared with when the glass tube has the circular-shaped cross section with the tube inner diameter being equal to the major tube inner diameter "D2". It should be noted here that a 2% improvement of the luminous efficiency can make the consumers notice improved luminous flux and so can add values to products.

2) Dimensions and Electrode Distance of the Arc Tube

The following describes the specific construction and dimensions of the arc tube 602 having the above-described oval-shaped cross section.

First, it is preferable that the inner circumference of the glass tube 609 forming the arc tube 602 is in a range of 5 to 9 mm inclusive for the same reason as that for the tube inner diameter "ϕi" of the glass tube 9 being set in a range of 5 to 9 mm inclusive in the first embodiment. Also, it is preferable that the minor tube inner diameter "D1" is not less than 3 mm but is less than the major tube inner diameter "D2". The minor tube inner diameter "D1" is to be set at a value not less than 3 mm so that the electrodes can be easily placed. The minor tube inner diameter "D1" is to be set at a value less than the major tube inner diameter "D2", for the purpose of making the inner circumference of the cross section substantially in an oval-shape. It should be noted here that the electrodes are each in a flat shape as shown in FIG. 2. A space of about 5 mm×3 mm on a plane is required for these electrodes.

The following describes methods for determining the dimensions and the electrode distance of the arc tube. The inner diameter of the straight glass tube 630 used for forming the spiral arc tube 602 is to be determined first. Then, the electrode distance "Le" of the arc tube 602 can be determined in the range indicated by the shaded area in FIG. 6 for the arc tube 2 having the circular-shaped cross section described in the first embodiment. To be more specific, the electrode distance "Le" can be determined using a value calculated by assuming the minor tube inner diameter "D1" as the tube inner diameter "ϕi" of the arc tube 2 shown in the figure.

FIG. 6 only shows values for the electrode distance "Le" when the tube inner diameter "ϕi" is 5 mm or less. The maximum values for the electrode distance "Le" when the tube inner diameter "ϕi" is not less than 3 mm and is less than 5 mm are on or below a line plotting points (3.0, 1160) and (5.0, 690), showing the tube inner diameter "ϕi" and the electrode distance "Le" as rectangular coordinates (ϕi, Le). The minimum values for the electrode distance "Le" are on or above a line drawn as extended from the line "2" until when the tube inner diameter "ϕi" is 3.0 mm. To be specific, values for (ϕi, Le) are to be set in a range surrounded by points (3.0, 445), (7.4, 275), (9.0, 290), (9.0, 360), and (3.0, 1160).

4. Ends of the Glass Tube

In the above embodiments, both ends of the glass tube, i.e., one end of the arc tube at the side where the case is positioned, are formed so as to extend straight in the direction substantially parallel to the axis "A" of the spiral arc tube (the direction perpendicular to a main surface of the holder). However, the ends of the glass tube may instead be inclined so that parts thereof closer to the holder are closer to the axis "A". By making the ends of the glass tube inclined toward the axis "A" in this way, the length of the arc tube in the axis direction can be made shorter than that of the arc tube 2 according to the above embodiments.

5. Others

The lamp 601 according to the sixth embodiment is an example where the present invention is applied to the arc tube formed by the glass tube having an oval-shaped cross section for use in a 11 W lamp as an alternative to a 60 W incandescent lamp. However, the present embodiment can be applied to arc tubes for use in lamps with other input powers.

a) 21 W Lamp as Alternative to 100 W Incandescent Lamp ("a" is Added to the Reference Numeral)

In this case, too, the dimensions of the arc tube 602a are to be set with reference to FIG. 8 in the same manner as described above. To be more specific, the minor tube inner diameter "D1" of the glass tube 609a used for forming the arc tube 602a is set first, so that the electrode distance "Le" can be determined using a value of the minor tube inner diameter "D1". FIG. 8 does not show values for the electrode distance "Le" when the tube inner diameter "ϕi" is 5 mm and less. The maximum values for the electrode distance "Le" when the tube inner diameter "ϕi" is not less than 3 mm and is less than 5 mm are on or below a line drawn as extended from the line "21" until when the tube inner diameter "ϕi" is 3.0 mm. The minimum values for the electrode distance "Le" are on or above a line drawn as extended from the line "22" until when the tube inner diameter "ϕi" is 3.0 mm. To be more specific, values for (ϕi, Le) are to be set in a range surrounded by points (3.0, 840), (7.4, 530), (9.0, 560), (9.0, 620), and (3.0, 1085).

b) High-Luminous-Flux Type 23 W Lamp as Alternative to 100 W Incandescent Lamp ("b" is Added to the Reference Numeral)

In this case, too, the dimensions of the arc tube 602b are to be set with reference to FIG. 9 in the same manner as described above. To be more specific, the minor tube inner diameter "D1" of the glass tube 609b used for forming the arc tube 602b is set first, so that the electrode distance "Le" can be determined using a value of the minor tube inner diameter "D1".

FIG. 9 does not show values for the electrode distance "Le" when the tube inner diameter "φi" is 5 mm and less. The maximum values for the electrode distance "Le" when the tube inner diameter "φi" is no less than 3 mm and is less than 5 mm are on or below a line drawn as extended from the line "31" until when the tube inner diameter "φi" is 3.0 mm. The minimum values for the electrode distance "Le" are on or above a line drawn as extended from the line "32" until when the tube inner diameter "φi" is 3.0 mm. To be more specific, values for (φi, Le) are to be set in a range surrounded by points (3.0, 975), (7.4, 570), (9.0, 600), (9.0, 670), and (3.0, 1165).

c) 7 W Lamp Alternative to 40 W Incandescent Lamp ("c" is Added to the Reference Numeral)

In this case, too, the dimensions of the arc tube 602c are to be set with reference to FIG. 10 in the same manner as described above. To be more specific, the minor tube inner diameter "D1" of the glass tube 609c used for forming the arc tube 602c is set first, so that the electrode distance "Le" can be determined using a value of the minor tube inner diameter "D1".

FIG. 10 does not show values for the electrode distance "Le" when the tube inner diameter "φi" is 5 mm and less. The maximum values for the electrode distance "Le" when the tube inner diameter "φi" is no less than 3 mm and is less than 5 mm are on or below a line drawn as extended from the line "41" until when the tube inner diameter "φi" is 3.0 mm. The minimum values for the electrode distance "Le" are on or above a line drawn as extended from the line "42" until when the tube inner diameter "φi" is 3.0 mm. To be more specific, values for (φi, Le) are to be set in a range surrounded by points (3.0, 330), (7.4, 200), (9.0, 230), (9.0, 320), and (3.0, 725).

(Modifications)

Although the present invention is described based on the above embodiments, the contents of the present invention should not be limited to specific examples shown in the above embodiments. For example, the following modifications are possible.

1. Appearance of the Arc Tube

Although the first to sixth embodiments describe the case where the arc tube has a spiral structure where the glass tube is spirally wound and has an outer circumference being in a circular shape as viewed in the axis direction, the glass tube may be wound in such a manner that the outer circumference of the arc tube viewed in the axis direction is in an oval-shape. In this case, a split molding fixture or the like needs to be used. Further, although the above embodiments describe the case where the spiral arc tube has the axis being in the same direction as the central axis of the base (vertical direction), the axis of the spiral arc tube may be in the direction perpendicular to the central axis of the base.

2. Tube Shape of the Arc Tube

The sixth embodiment describes the case where the inner circumference surface of the cross section of the glass tube is not in a circular shape, in particular, it is in an oval-shape having the first diameter in the direction substantially perpendicular to the axis around which the glass tube is wound being smaller than the second diameter in the direction substantially parallel to the axis. However, the inner circumference surface of the cross section of the glass tube may be in any other shapes as long as the first diameter is smaller than the second diameter and a ratio of the first diameter to the second diameter is 0.85 or less.

Figure 16A:
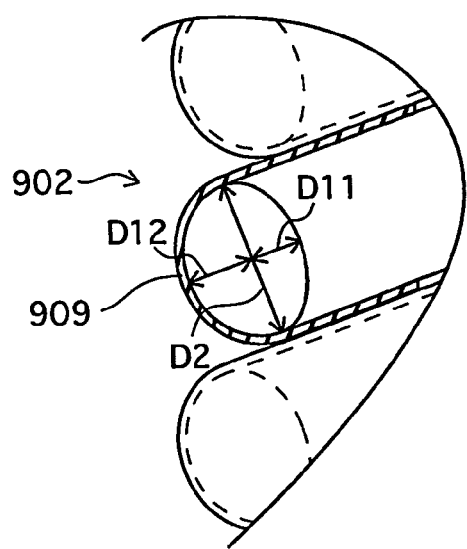
FIGS. 16A to 16C show modifications of a cross sectional shape of a glass tube forming an arc tube.

For example, the cross section of the glass tube 909 may be in such an oval-shape as shown in FIG. 16A where the inner side and the outer side of the cross section of the arc tube 902 have a different shape. To be more specific, the inner circumference part of the arc tube 902 at the side of the axis with respect to the major diameter "D2" (hereafter referred to as "an inner side of the arc tube", i.e, right side in FIG. 16) has such an oval shape with its minor diameter being twice the radius "D11". Also, the inner circumference part of the arc tube 902 positioned at the opposite side (hereafter referred to as "an outer side of the arc tube", i.e., left side in FIG. 16) has such an oval shape with its minor diameter being twice the radius "D12". Further, the inner circumference part of the arc tube 902 at the outer side may have such a circular shape with the diameter being equal to the major diameter "D2".

In such a case, too, the minor diameter "D1" (D1=D11+D12) is smaller than the major diameter "D2", and so the optical path on which ultraviolet light emitted from mercury atoms travels to the tube wall can be shortened and an optimum mercury vapor pressure within the arc tube 902 can be increased, as compared with the case where the cross section of the glass tube 909 has a circular shape with the inner diameter being equal to the major diameter "D2".

Particularly when the radius "D11" is smaller than the radius "D12", the inner circumference part of the arc tube 902 at the inner side is more distant from the axis of the arc tube 902, and so the electrode distance can be longer, as compared with the case where the cross section of the glass tube 909 has an oval shape with the minor diameter being twice the radius "D12".

Figure 17A:
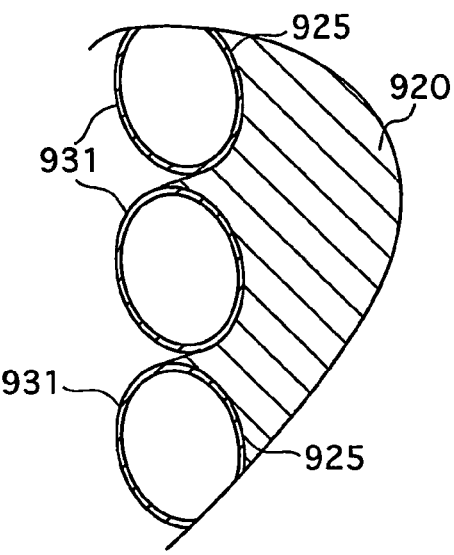
FIGS. 17A to 17C are longitudinal sectional views showing the state where the glass tube is wound around a mandrel to shape an arc tube according to each modification.

In this case, too, by making the cross section of the groove 925 match a part of the oval arc-shape as shown in FIG. 17A, the cross section of the glass tube 931 can be easily made into the above-described shape.

Figure 16B:
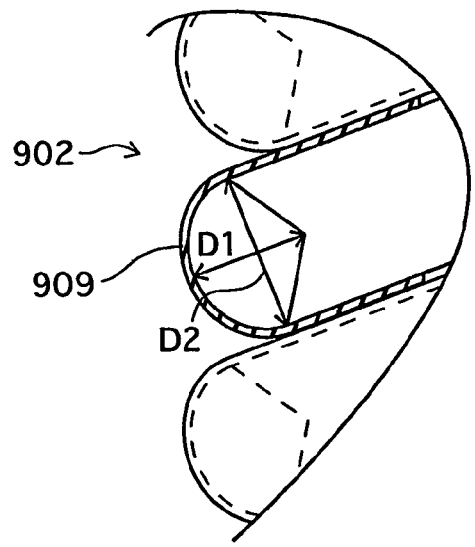

Also, for the cross section of the glass tube 909 as shown in FIG. 16B, the inner circumference part of the arc tube 902 at the inner side with respect to the major diameter "D2" may be projected in a triangular shape toward the inner side of the arc tube 902. Further, the inner circumference part of the arc tube 902 at the outer side with respect to the major diameter "D2" may have a circular shape with the diameter being equal to the major diameter "D2".

Figure 17B:
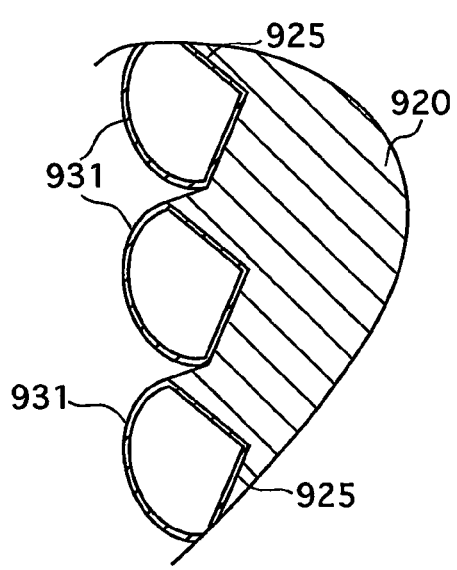

In this case, too, by making the cross section of the groove 925 project in a triangular shape as shown in FIG. 17B, a part of the cross section of the glass tube 931 can be easily made into the above-described projected triangular shape.

It should be noted here that FIGS. 16A and 16B show the cross section of the glass tube 909 in which the inner circumference part at the outer side of the arc tube 909 is in an oval-shape. The substantially oval-shape of the present invention intends to include such an oval-shape.

Figure 16C:
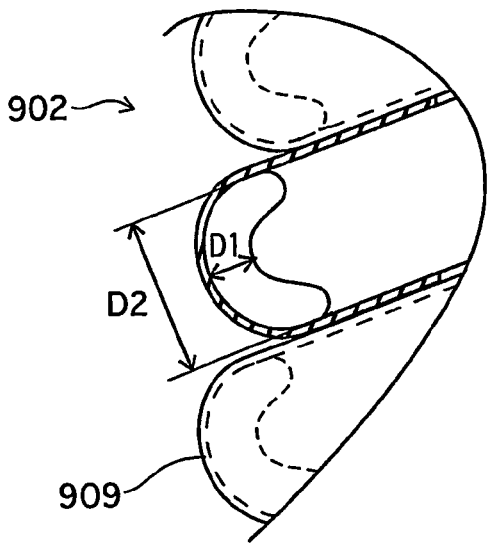

On the other hand, for the cross section of the glass tube 909 as shown in FIG. 16C, the inner circumference part of the arc tube 902 at the inner side may be in a V-shape that is recessed toward the outer side of the arc tube 902. Further, the inner circumference part of the arc tube 902 at the outer side may be in a circular shape with the diameter being equal to the major diameter "D2".

Here, the following describes the specific construction, dimensions, and performances of a lamp including the arc tube 902 formed by the glass tube 909 with a V-shaped cross section. The glass tube 909 used for forming the arc tube 902 has a cross section being in a V-shape, with the minor tube diameter "D1" (the length of the shorter side shown in the figure) of 4.0 mm and the major tube diameter "D2" (the length of the longer side shown in the figure) of 7.4 mm. The electrode distance is set at 380 mm. The arc tube 902 is formed to have a spiral structure having five winds, and has the outer diameter "φh" of 36 mm and the length "Lh" of 60 mm as in the sixth embodiment.

The lamp has the lamp diameter "φ" of 55 mm and the lamp length "L" of 100 mm, and is more compact than a 60 W incandescent lamp (with the lamp diameter "φ" of 60 mm and the lamp length "L" of 110 mm).

The following describes the performances of the lamp with the above-described construction.

The lamp was lit with the base being oriented upward by applying the input power of 11 W. According to the measurement results for the lamp, the luminous flux rising characteristics at the lamp startup were equivalent to those of a conventional fluorescent lamp for general lighting. Also, at the lamp current of about 71 mA, the luminous flux was 830 lm, and the luminous efficiency was as high as 75.5 lm/W.

Figure 17C:
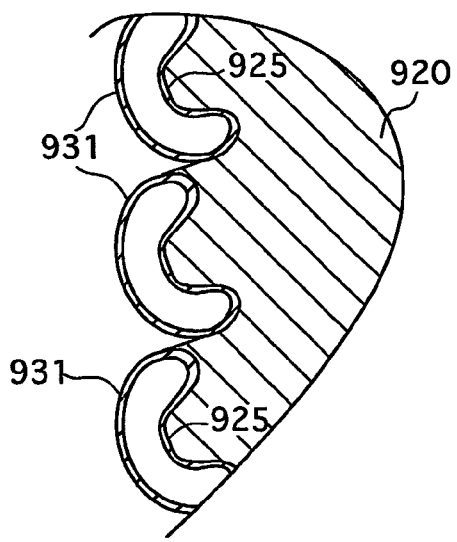

The luminous efficiency shows an improvement of 2.6% compared with the lamp in which the glass tube has an oval-shaped cross section as described in the item 1. b) in the sixth embodiment. It should be noted here that this lamp has the lamp life of 6000 hours or more as the lamps according to the above embodiments. In this case, too, by making the cross section of the groove 925 in a V-shape as shown in FIG. 17C, the cross section of the glass tube 931 can be easily made into a V-shape.

For each of the glass tubes 609 and 909 shown in the sixth embodiment and in FIGS. 16A to 16C, the direction of the first diameter "D1" of the cross section corresponds to the direction inclined at the spiral angle with respect to the horizontal direction (the axis direction). The present invention assumes this case to be included in the direction substantially perpendicular to the axis. Also, although the above embodiments and modifications describe the case where the shape of the inner circumference and the shape of the outer circumference of each of the glass tubes 609 and 909 are substantially the same, they may not necessarily be the same. For example, the inner circumference may be in an oval-shape, and the outer circumference may be in a circular shape.

3. Form of Mercury Enclosed

In the above embodiments, mercury is enclosed within an arc tube basically not in the form of an amalgam but in the single form. In this case, a small-sized auxiliary amalgam according to a conventional technique, e.g., a stainless mesh plated with indium (In), may be provided in a vicinity of the electrodes or the like. A small-sized auxiliary amalgam only absorbs a small portion of mercury enclosed, leaving a required amount of mercury present in the single form within the arc tube, and so does not degrade the luminous efficiency rising characteristics.

Moreover, although mercury is enclosed within an arc tube in the single form in the above embodiments, a small amount of amalgam may be added in such a range that does not greatly degrade the luminous flux rising characteristics. It should be noted here that an amalgam used here is mainly composed of In and/or Pb, more specifically, is BiIn, BiPbSn, InPb, BiIn, InPbSn, or the like.

Further, although mercury is enclosed within an arc tube in the single form in the above embodiments, mercury may be enclosed in the form of an amalgam if the amalgam has mercury vapor pressure characteristics substantially equal to those of mercury in the single form. Such an amalgam having substantially equivalent mercury vapor pressure characteristics is an amalgam not mainly composed of In and/or Pb, specifically, ZnHg, FeHg, BiHg, BiSnHg, SnHg, and the like. A single or a combination of such amalgams may be used. In this case, too, a small amount of other amalgams such as BiIN, BiPbSn, InPb, BiIn, and InPbSn may be used in a range that does not greatly degrade the luminous flux rising characteristics as compared with the case where mercury is enclosed in the single form.

4. Heat-Conductive Member

Although the above embodiments describe the case where the bottom end part of the arc tube and the bottom end part of the globe at its inner wall are connected with each other via a silicone resin, the other methods may be employed as long as the heat in the arc tube can be conducted to the globe side during lighting, i.e., as long as the bottom end part of the arc tube and the bottom end part of the globe at its inner wall are thermally connected during lighting.

For example, the bottom end part of the arc tube and the silicone resin may not be connected with each other but may simply be contacted with each other. Also, the silicone resin and the arc tube may not be contacted with each other when the lamp is off, and the silicone resin may be expanded to be contacted with the arc tube after the lamp is lit. It should be noted here that when the silicone resin and the arc tube, or the silicone resin and the globe, are not connected with each other, a degree of the temperature decrease in the arc tube is lower than when the silicone resin and the arc tube, or the silicone resin and the globe, are connected with each other. Because the silicone resin and the arc tube, or the silicone resin and the globe, are contacted with each other after the lamp is lit, at least a certain degree of effect of lowering the temperature of the arc tube can be obtained.

Also, to effectively conduct heat in the arc tube to the globe, an amount of heat conducted to the heat-conductive member is to be increased. As one method to do this, a swelling unit may be provided for increasing an area where the arc tube and the heat-conductive member are contacted.

Figure 18:
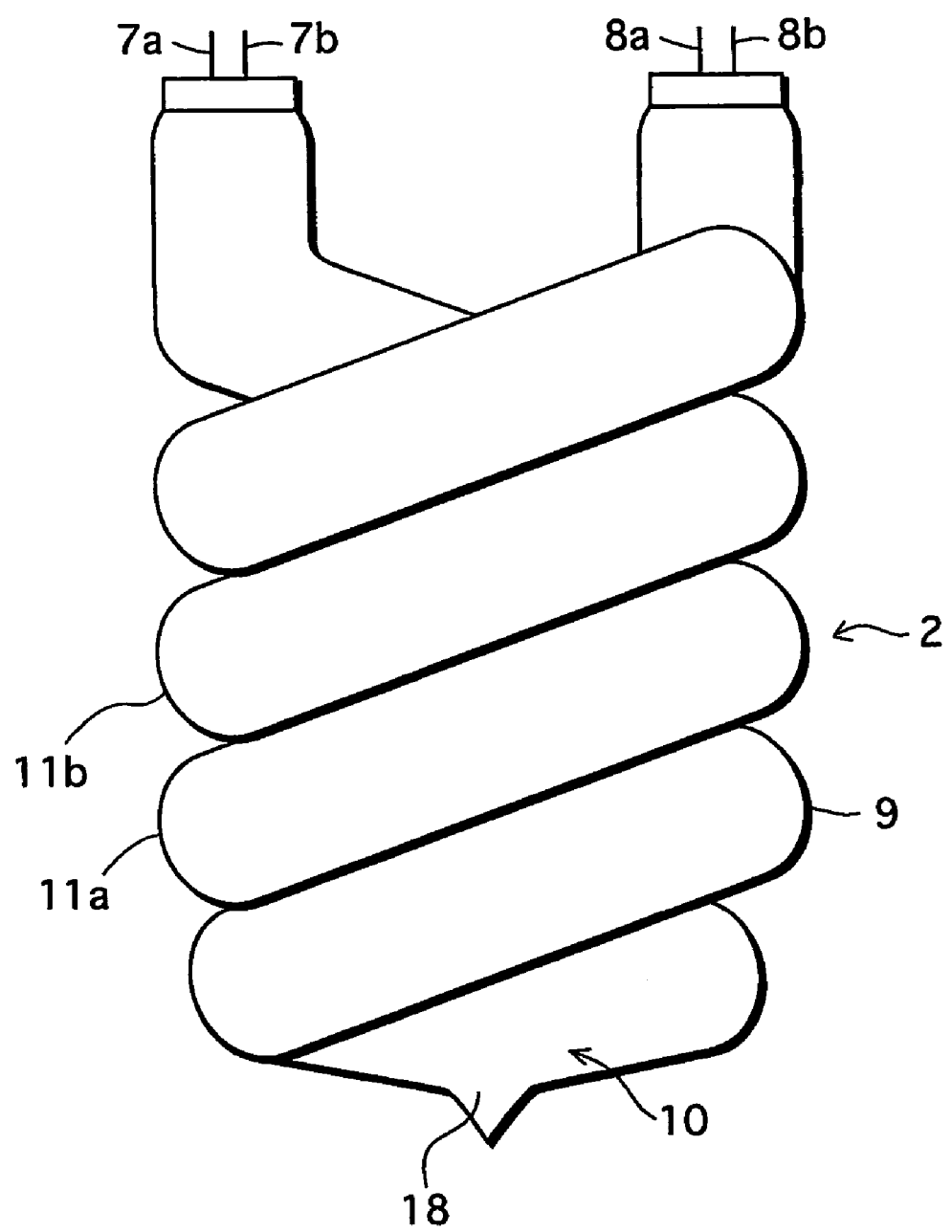
FIG. 18 shows an example of an arc tube in which a swelling part is provided at its end opposite to the electrode side.
Figure 19:
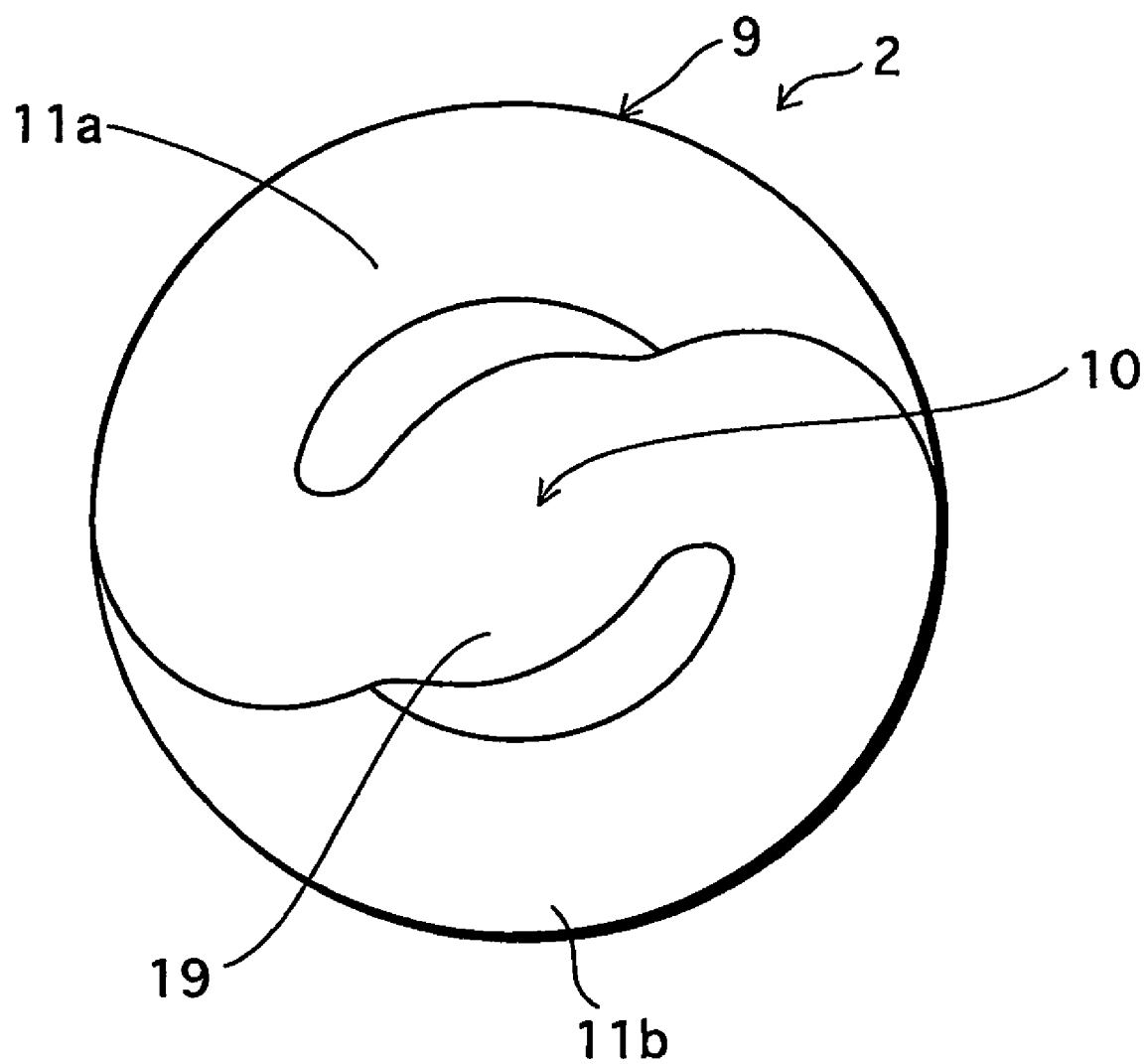
FIG. 19 shows the example of the arc tube in which the swelling part is provided at its end opposite to the electrode side.

To be specific, the swelling unit may be formed as a projected part 18 by making a part of the bottom end part of the arc tube project toward the globe side as shown in FIG. 18, or as a thick diameter part 19 by increasing the diameter of a part of the glass tube at the bottom end of the arc tube as shown in FIG. 19. It should be noted here that FIGS. 18 and 19 show the cases where the swelling units formed by the projected part 18 and the thick diameter part 19 are applied to the lamp 1 according to the first embodiment.

By providing such a swelling unit, the coolest point temperature "T" in the arc tube is lowered by 1 to 2° C., thereby further improving the luminous efficiency.

The swelling unit can be easily formed by heating the corresponding part of the glass tube so as to be softened, and injecting a gas whose pressure is controlled into the glass tube.

INDUSTRIAL APPLICATION

The compact self-ballasted fluorescent lamp of the present invention can be utilized to improve luminous efficiency, and the manufacturing method for the arc tube of the present invention can be utilized to efficiently manufacture a bent arc tube.

The invention claimed is:

1. A fluorescent lamp comprising:
an arc tube that is formed by a bent glass tube and in which mercury is enclosed;
a globe that covers the arc tube; and
a heat-conductive member that is provided between a part of the arc tube and the globe for contacting and conducting heat from the arc tube to the globe,
wherein the arc tube has a double-spiral structure, and encloses a single discharge path and a pair of electrodes,
the mercury enclosed in the arc tube is in at least one of (a) a substantially single form, and (b) an amalgam form whose mercury vapor pressure characteristics at lighting are substantially equivalent to mercury vapor pressure characteristics of mercury in a single form at lighting,
the part of the arc tube contacting the heat-conductive member is at a most distant part along an axis of the glass tube relative to the pair of electrodes and is substantially at the middle of the discharge path, and
the glass tube has a substantially circular-shaped cross section, and has an inner diameter in a range of 5 to 9 mm inclusive.

2. The fluorescent lamp of claim 1,
wherein the amalgam form of mercury is at least one amalgam selected from the group consisting of ZnHg, FeHg, BiHg, BiSnHg, and SnHg.

3. The fluorescent lamp of claim 1,
wherein the arc tube includes electrodes that are provided at both ends of the glass tube, and
when an inner diameter "$\phi i$ (mm)" of the glass tube and a distance "Le (mm)" between the electrodes are expressed as rectangular coordinates ($\phi i$, Le), values for the rectangular coordinates ($\phi i$, Le) are within a range surrounded by points (5.0, 370), (7.4, 275), (9.0, 290), (9.0, 360), and (5.0, 690).

4. The fluorescent lamp of claim 1,
wherein the arc tube includes electrodes that are provided at both ends of the glass tube, and
when an inner diameter "$\phi i$ (mm)" of the glass tube and a distance "Le (mm)" between the electrodes are expressed as rectangular coordinates ($\phi i$, Le), values for the rectangular coordinates ($\phi i$, Le) are within a range surrounded by points (5.0, 700), (7.4, 530), (9.0, 560), (9.0, 620), and (5.0, 930).

5. The fluorescent lamp of claim 1,
wherein the arc tube includes electrodes that are provided at both ends of the glass tube, and
when an inner diameter "$\phi i$ (mm)" of the glass tube and a distance "Le (mm)" between the electrodes are expressed as rectangular coordinates ($\phi i$, Le), values for the rectangular coordinates ($\phi i$, Le) are within a range surrounded by points (5.0, 800), (7.4, 570), (9.0, 600), (9.0, 670), and (5.0, 1000).

6. The fluorescent lamp of claim 1,
wherein the arc tube includes electrodes that are provided at both ends of the glass tube, and
when an inner diameter "$\phi i$ (mm)" of the glass tube and a distance "Le (mm)" between the electrodes are expressed as rectangular coordinates ($\phi i$, Le), values for the rectangular coordinates ($\phi i$, Le) are within a range surrounded by points (5.0, 270), (7.4, 200), (9.0, 230), (9.0, 320), and (5.0, 590).

7. The fluorescent lamp of claim 1,
wherein the glass tube has a double-spiral structure that is made up of a turning part, a first spiral part, and a second spiral part, the turning part being positioned substantially in a middle between both ends of the glass tube, the first spiral part starting from one end of the glass tube and being wound around an axis toward the turning part, the second spiral part starting from the turning part and being wound around the axis toward the other end of the glass tube, and
the glass tube is connected to the globe in a vicinity of the turning part thereof, via the heat-conductive member.

8. The fluorescent lamp of claim 7,
wherein the turning part of the glass tube has a projection extending toward the globe.

9. A fluorescent lamp comprising:
an arc tube that is formed by a bent glass tube;
a pair of electrodes to provide a single discharge path within the arc tube;
a globe that covers the arc tube; and
a heat-conductive member that is provided between a part of the arc tube and the globe for conducting heat from the arc tube to the globe,
wherein a cross section of the glass tube at an inner circumference thereof is in a non-circular shape,
the arc tube is spiral in which the glass tube is spirally wound around an axis, and
a first diameter of the cross section at the inner circumference is smaller than a second diameter of the cross section at the inner circumference, the first diameter being in a direction substantially perpendicular to the axis, the second diameter being in a direction substantially parallel to the axis wherein the heat-conductive member is at a most distant part along the axis of the spiral tube from the pair of electrodes and is substantially at a middle of the discharge path.

10. The fluorescent lamp of claim 9,
wherein the glass tube is spirally wound around an axis, and
a first diameter of the cross section at the inner circumference is smaller than a second diameter of the cross section at the inner circumference, the first diameter being in a direction substantially perpendicular to the axis, the second diameter being in a direction substantially parallel to the axis.

11. The fluorescent lamp of claim 10,
wherein the cross section of the glass tube is in a substantially oval-shape.

12. The fluorescent lamp of claim 10,
wherein the cross section of the glass tube is in a V-shape.

13. The fluorescent lamp of claim 10,
wherein when the first diameter is "D1 (mm)" and the second diameter is "D2(mm)", a value for "D2" is in a range of 5 to 9 mm inclusive, and a value for "D1" is not less than 3 mm and is less than the value for "D2."

14. The fluorescent lamp of claim 13,
wherein the arc tube includes electrodes that are provided at both ends of the glass tube, and
when the first diameter "D1 (mm)" and a distance "Le (mm)" between the electrodes are expressed as rectangular coordinates (D1, Le), values for the rectangular coordinates (D1, Le) are within a range surrounded by points (3.0, 445), (7.4, 275), (9.0, 290), (9.0, 360), and (3.0, 855).

15. The fluorescent lamp of claim 13,
wherein the arc tube includes electrodes that are provided at both ends of the glass tube, and
when the first diameter "D1 (mm)" and a distance "Le (mm)" between the electrodes are expressed as rectangular coordinates (D1, Le), values for the rectangular coordinates (D1, Le) are within a range surrounded by points (3.0, 840), (7.4, 530), (9.0, 560), (9.0, 620), and (3.0, 1085).

16. The fluorescent lamp of claim 13, wherein the arc tube includes electrodes that are provided at both ends of the glass tube, and when the first diameter "D1 (mm)" and a distance "Le (mm)" between the electrodes are expressed as rectangular coordinates (D1, Le), values for the rectangular coordinates (D1, Le) are within a range surrounded by points (3.0, 975), (7.4, 570), (9.0, 600), (9.0, 670), and (3.0, 1165).

17. The fluorescent lamp of claim 13, wherein the arc tube includes electrodes that are provided at both ends of the glass tube, and when the first diameter "D1 (mm)" and a distance "Le (mm)" between the electrodes are expressed as rectangular coordinates (D1, Le), values for the rectangular coordinates (D1, Le) are within a range surrounded by points (3.0, 330), (7.4, 200), (9.0, 230), (9.0, 320), and (3.0, 725).

18. The fluorescent lamp of claim 9, wherein the glass tube has a double-spiral structure that is made up of a turning part, a first spiral part, and a second spiral part, the turning part being positioned substantially in a middle between both ends of the glass tube, the first spiral part starting from one end of the glass tube and being wound around an axis toward the turning part, the second spiral part starting from the turning part and being wound around the axis toward the other end of the glass tube.

19. The fluorescent lamp of claim 9, wherein mercury is enclosed within the arc tube in a substantially single form without being in an amalgam form.

20. The fluorescent lamp of claim 18, further including a globe that covers the arc tube, wherein the glass tube is connected to the globe in a vicinity of the turning part thereof, via the heat-conductive member.

21. The fluorescent lamp of claim 9, wherein the glass tube has a circular-shaped cross section at parts thereof where electrodes are sealed.

22. The fluorescent lamp of claim 7, wherein a distance between the turning part and the globe that are connected with each other via the heat-conductive member is not more than 6.0 mm.

23. The fluorescent lamp of claim 7, wherein one of metal, rubber, and resin is used as the heat-conductive member.

24. The fluorescent lamp of claim 23, wherein a transparent silicone resin is used as the heat-conductive member.

25. The fluorescent lamp of claim 7, wherein a swelling part that increases an area where the arc tube and the heat-conductive member are connected with each other is provided at a part of the arc tube that is connected to the heat-conductive member.

26. The fluorescent lamp of claim 7, wherein a distance between the turning part of the glass tube and each of the first spiral part and the second spiral part is smaller than an outer diameter of the turning part of the glass tube.

27. An arc tube for a fluorescent lamp, the fluorescent lamp comprising:
the arc tube formed by a spirally bent glass tube;
a globe that covers the arc tube; and
a heat-conductive member that is provided between a part of the glass tube and the globe for contacting and conducting heat from the arc tube to the globe,
wherein the glass tube encloses a pair of electrodes to provide a simple discharge path,
the part of the glass tube in contact with the glass tube is at a most distant part along an axis thereof from the pair of electrodes and is substantially at a middle of the discharge path, and,
mercury is enclosed in the glass tube in at least one of (a) a substantially single form, and (b) an amalgam form whose mercury vapor pressure characteristics at lighting are substantially equivalent to mercury vapor pressure characteristics of mercury in a single form at lighting, and
the glass tube has a substantially circular-shaped cross section, and has an inner diameter in a range of 5 to 9 mm inclusive.

28. The arc tube of claim 27, wherein the glass tube has a double-spiral structure that is made up of a turning part, a first spiral part, and a second spiral part, the turning part being positioned substantially in a middle between both ends of the glass tube, the first spiral part starting from one end of the glass tube and being wound around an axis toward the turning part, the second spiral part starting from the turning part and being wound around the axis toward the other end of the glass tube, and
the coolest point is the turning part.

29. A fluorescent lamp comprising:
an arc tube that is formed by a bent glass tube having a spiral configuration and in which mercury is enclosed;
a pair of electrodes to provide a single discharge path within the arc tube;
a globe that covers the arc tube; and
a heat-conductive member that is provided between a part of the arc tube and the globe for contacting and conducting heat from the arc tube to the globe,
wherein the arc tube encloses a pair of electrodes thereon,
the mercury enclosed in the arc tube is in at least one of (a) a substantially single form, and (b) an amalgam form whose mercury vapor pressure characteristics at lighting are substantially equivalent to mercury vapor pressure characteristics of mercury in a single form at lighting,
the part of the arc tube, contacting the heat-conductive member, which is in contact with the globe, is at a most distant part along an axis of the glass tube from the pair of electrodes and is substantially at a middle of the discharge path,
the glass tube has a substantially circular-shaped cross section, and has an inner diameter in a range of 5 to 9 mm inclusive, and
a temperature of a connection point between the arc tube and the globe, during lighting of the fluorescent lamp, is within a range of 60° C. to 65° C.

* * * * *